(12) United States Patent
Piro, Jr. et al.

(10) Patent No.: US 10,333,724 B2
(45) Date of Patent: Jun. 25, 2019

(54) METHOD AND SYSTEM FOR LOW-OVERHEAD LATENCY PROFILING

(71) Applicant: Oracle International Corporation, Redwood Shores, CA (US)

(72) Inventors: Louis Thomas Piro, Jr., San Jose, CA (US); Jens Kaemmerer, Pacific Grove, CA (US); Ashish Srivastava, Santa Clara, CA (US); Diana Yuryeva, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 278 days.

(21) Appl. No.: 14/554,026

(22) Filed: Nov. 25, 2014

(65) Prior Publication Data

US 2015/0149625 A1    May 28, 2015

Related U.S. Application Data

(60) Provisional application No. 61/908,596, filed on Nov. 25, 2013.

(51) Int. Cl.
*H04L 12/14*      (2006.01)
*H04L 12/26*      (2006.01)

(52) U.S. Cl.
CPC ...... *H04L 12/1403* (2013.01); *H04L 43/0858* (2013.01)

(58) Field of Classification Search
CPC .................. H04L 12/1403; H04L 43/0858
USPC ................................................. 709/224
See application file for complete search history.

(56) References Cited

U.S. PATENT DOCUMENTS

| 6,295,447 | B1 | 9/2001 | Reichelt et al. |
| 6,606,668 | B1 | 8/2003 | McLampy et al. |
| 7,366,790 | B1 * | 4/2008 | Rustad ............... H04L 43/0858 370/229 |

(Continued)

OTHER PUBLICATIONS

Notice of Allowance and Fee(s) Due and Examiner-Initated Interview Summary for U.S. Appl. No. 14/620,895 (dated Sep. 14, 2016).

(Continued)

*Primary Examiner* — Nicholas R Taylor
*Assistant Examiner* — Chong G Kim
(74) *Attorney, Agent, or Firm* — Jenkins, Wilson, Taylor & Hunt, P.A.

(57) ABSTRACT

The present disclosure provides a method, non-transitory computer-readable storage medium, and computer system that implement a latency monitoring and reporting service configured to collect and report latency of service transactions. In one embodiment, a chronicler object is generated and transmitted to a charging engine, where the chronicler object is configured to collect a set of time points as the chronicler object travels through one or more components of the charging engine. Upon return of the chronicler object, the set of time points is extracted from the chronicler object and added to one of a plurality of accumulator objects. Each accumulator object includes a plurality of sets of time points from a plurality of chronicler objects that are received during a reporting window. The plurality of sets of times points of each accumulator object is used to calculate the latency of service transactions.

15 Claims, 26 Drawing Sheets

(56) References Cited

U.S. PATENT DOCUMENTS

| | | | |
|---|---|---|---|
| 7,457,868 B1* | 11/2008 | Guo | H04L 41/046 709/203 |
| 7,685,270 B1* | 3/2010 | Vermeulen | G06Q 30/0603 370/252 |
| 7,962,458 B2 | 6/2011 | Holenstein et al. | |
| 8,116,326 B2* | 2/2012 | Rockel | G06Q 30/04 370/401 |
| 8,189,487 B1* | 5/2012 | Mateski | H04L 69/22 370/242 |
| 8,223,935 B2* | 7/2012 | Krishnamoorthy | G06Q 40/00 379/114.01 |
| 8,341,044 B1 | 12/2012 | Patro et al. | |
| 8,411,831 B2 | 4/2013 | Thompson | |
| 8,423,505 B2 | 4/2013 | Chauvet et al. | |
| 8,577,701 B1 | 11/2013 | Howard et al. | |
| 8,606,958 B1* | 12/2013 | Evans | A63F 13/12 709/203 |
| 8,640,188 B2 | 1/2014 | Riley | |
| 8,737,957 B2 | 5/2014 | Raleigh | |
| 8,965,861 B1 | 2/2015 | Shalla et al. | |
| 9,268,888 B1* | 2/2016 | Leong | G06F 17/5031 |
| 9,398,434 B2 | 7/2016 | Piro, Jr. | |
| 9,553,998 B2 | 1/2017 | Permude | |
| 9,557,889 B2 | 1/2017 | Raleigh et al. | |
| 9,710,833 B2 | 7/2017 | Malaksamudra et al. | |
| 9,948,791 B2 | 4/2018 | Permude | |
| 2002/0147745 A1 | 10/2002 | Houben et al. | |
| 2003/0172145 A1 | 9/2003 | Nguyen | |
| 2003/0204592 A1 | 10/2003 | Crouse-Kemp et al. | |
| 2007/0288367 A1* | 12/2007 | Krishnamoorthy | G06Q 20/102 705/40 |
| 2008/0010379 A1* | 1/2008 | Zhao | G06Q 20/123 709/226 |
| 2008/0014904 A1 | 1/2008 | Crimi et al. | |
| 2008/0049630 A1* | 2/2008 | Kozisek | H04L 41/0823 370/250 |
| 2008/0141063 A1* | 6/2008 | Ridgeway | G06F 5/12 713/501 |
| 2008/0247331 A1* | 10/2008 | Becker | H04L 43/0858 370/253 |
| 2009/0207994 A1 | 8/2009 | Bruce et al. | |
| 2009/0307347 A1* | 12/2009 | Cherkasova | G06F 11/3419 709/224 |
| 2009/0311989 A1* | 12/2009 | Duan | H04L 12/14 455/406 |
| 2010/0130162 A1* | 5/2010 | Yang | H04M 15/00 455/406 |
| 2010/0228707 A1 | 9/2010 | Labuda | |
| 2010/0312677 A1* | 12/2010 | Gardner | H04M 15/00 705/30 |
| 2011/0010581 A1 | 1/2011 | Tanttu et al. | |
| 2011/0055063 A1* | 3/2011 | Zhang | G06Q 30/04 705/34 |
| 2011/0112905 A1* | 5/2011 | Pulijala | G06Q 30/0267 705/14.64 |
| 2011/0141922 A1* | 6/2011 | Kotrla | H04L 43/0852 370/252 |
| 2011/0167471 A1 | 7/2011 | Riley et al. | |
| 2011/0211465 A1* | 9/2011 | Farrugia | H04L 12/14 370/252 |
| 2011/0225113 A1 | 9/2011 | Mann | |
| 2011/0225379 A1 | 9/2011 | Eguchi et al. | |
| 2011/0258094 A1* | 10/2011 | Guo | H04M 15/08 705/34 |
| 2012/0030077 A1* | 2/2012 | Pei | G06Q 30/04 705/34 |
| 2012/0101952 A1 | 4/2012 | Raleigh et al. | |
| 2012/0116938 A1* | 5/2012 | Cai | G06Q 30/0284 705/34 |
| 2012/0131129 A1* | 5/2012 | Agarwal | H04L 43/0852 709/216 |
| 2012/0131391 A1 | 5/2012 | Musolff | |
| 2012/0202455 A1* | 8/2012 | Cai | G06Q 20/102 455/406 |
| 2013/0080263 A1* | 3/2013 | Goldman | G06Q 30/02 705/14.69 |
| 2013/0179363 A1* | 7/2013 | Texier | G06Q 30/0283 705/347 |
| 2013/0212065 A1 | 8/2013 | Rahnama | |
| 2013/0282626 A1 | 10/2013 | White et al. | |
| 2013/0304616 A1 | 11/2013 | Raleigh | |
| 2013/0332345 A1* | 12/2013 | Carter | G06Q 20/14 705/39 |
| 2014/0040344 A1 | 2/2014 | Gehring et al. | |
| 2014/0082170 A1* | 3/2014 | Kaemmerer | H04L 67/1002 709/223 |
| 2014/0179266 A1 | 6/2014 | Schultz et al. | |
| 2015/0019514 A1 | 1/2015 | Forster et al. | |
| 2015/0026260 A1 | 1/2015 | Worthley | |
| 2015/0029894 A1* | 1/2015 | Lu | H04M 15/61 370/259 |
| 2015/0049647 A1* | 2/2015 | Goermer | H04L 12/1403 370/259 |
| 2015/0089509 A1 | 5/2015 | Brown et al. | |
| 2015/0148003 A1* | 5/2015 | Piro, Jr. | G06Q 30/04 455/406 |
| 2015/0148004 A1* | 5/2015 | Piro, Jr. | H04W 4/24 455/406 |
| 2015/0149625 A1 | 5/2015 | Piro, Jr. et al. | |
| 2015/0181045 A1 | 6/2015 | Lang et al. | |
| 2015/0206116 A1 | 7/2015 | Bess et al. | |
| 2015/0222516 A1* | 8/2015 | Deval | H04L 67/1029 370/253 |
| 2015/0242481 A1 | 8/2015 | Hasegawa et al. | |
| 2015/0310512 A1 | 10/2015 | Malaksamudra et al. | |
| 2015/0326497 A1 | 11/2015 | Guionnet et al. | |
| 2015/0356117 A1 | 12/2015 | Kaemmerer et al. | |
| 2015/0358484 A1 | 12/2015 | Permude | |
| 2017/0103457 A1* | 4/2017 | Acuna-Rohter | G06Q 20/10 |
| 2017/0134591 A1 | 5/2017 | Permude | |

OTHER PUBLICATIONS

Final Office Action for U.S. Appl. No. 14/199,457 (dated May 25, 2016).

Non-Final Office Action for U.S. Appl. No. 14/620,895 (dated Mar. 23, 2016).

Non-Final Office Action for U.S. Appl. No. 14/272,700 (dated Mar. 23, 2016).

Notice of Allowance and Fee(s) Due for U.S. Appl. No. 14/490,051 (dated Mar. 18, 2016).

Final Office Action for U.S. Appl. No. 14/259,503 (dated Jan. 28, 2016).

Applicant-Initiated Interview Summary for U.S. Appl. No. 14/490,051 (dated Dec. 17, 2015).

Restriction and/or Election Requirement for U.S. Appl. No. 14/620,895 (dated Dec. 9, 2015).

Non-Final Office Action for U.S. Appl. No. 14/490,051 (dated Oct. 9, 2015).

Non-Final Office Action for U.S. Appl. No. 14/199,457 (dated Oct. 6, 2015).

Non-Final Office Action for U.S. Appl. No. 14/259,503 (dated Aug. 17, 2015).

"Overview of 3GPP Release 11 V0.2.0 (Sep. 2014)," ETSI Mobile Competence Centre, 2014.

3GPP, "Digital cellular telecommunications system (Phase 2+); Universal Mobile Telecommunications System (UMTS); LTE; IP Multimedia Subsystem (IMS) Service Continuity; Stage 2," Technical Specification, ETSI TS 123 237 V11.9.0, Release 11, pp. 1-170 (Sep. 2013).

"Synchronous Optical Network (SONET) Transport Systems: Common Generic Criteria," Telcordia Technologies Generic Requirements, GR-253-CORE, Issue 4, pp. 1-697 (Dec. 2005).

"Overview of 3GPP Release 99, Summary of all Release 99 Features," ETSI Mobile Competence Centre, 2004.

(56) References Cited

OTHER PUBLICATIONS

"ANSI T1.107-200x," Digital Hierarchy—Formats Specifications, American National Standard for Telecommunications, pp. 1-92 (2001).
"American National Standard for Telecommunications—Digital hierarchy—Electrical interfaces," American National Standards Institute (ANSI), ANSI T1.102-1987, pp. 1-31 (Aug. 27, 1987).
Notice of Allowance and Fee(s) Due for U.S. Appl. No. 14/259,503 (dated Apr. 10, 2017).
Applicant Initated Interview Summary for U.S. Appl. No. 14/259,503 (dated Mar. 3, 2017).
Applicant Initated Interview Summary for U.S. Appl. No. 14/199,457 (dated Mar. 3, 2017).
Non-Final Office Action for U.S. Appl. No. 14/199,457 (dated Dec. 7, 2016).
Non-Final Office Action for U.S. Appl. No. 14/259,503 (dated Dec. 1, 2016).
Final Office Action for U.S. Appl. No. 14/272,700 (dated Oct. 6, 2016).
Notice of Allowance and Fee(s) Due for U.S. Appl. No. 15/411,714 (dated Nov. 13, 2017).
Advisory Action for U.S. Appl. No. 14/199,457 (dated Oct. 18, 2017).
Examiner-Initiated Interview Summary for U.S. Appl. No. 15/411,714 (dated Aug. 9, 2017).
Non-Final Office Action for U.S. Appl. No. 15/411,714 (dated Jul. 21, 2017).
Final Office Action for U.S. Appl. No. 14/199,457 (dated Jun. 22, 2017).
Non-Final Office Action for U.S. Appl. No. 14/199,457 (dated Apr. 5, 2018).
Final Office Action for U.S. Appl. No. 14/688,503 (dated Aug. 15, 2018).
Applicant Initiated Interview Summary for U.S. Appl. No. 14/688,503 (dated Apr. 5, 2018).
Non-Final Office Action for U.S. Appl. No. 14/688,503 (dated Dec. 29, 2017).
Advisory Action and AFCP 2.0 Decision for U.S. Appl. No. 14/688,503 (dated Dec. 27, 2018).

\* cited by examiner

| Chronicler Object 530 | | |
|---|---|---|
| | Time Stamp 620 | Interception Point Label 630 |
| Time Point 610(1) | TimeStamp1 | ptA_Tx |
| Time Point 610(2) | TimeStamp2 | ptB_Rx |
| Time Point 610(3) | TimeStamp3 | ptC_Rx |
| ... | | |
| Time Point 610(10) | TimeStamp10 | ptD_Rx |
| Time Point 610(11) | TimeStamp11 | ptC_Rx |
| Time Point 610(12) | TimeStamp12 | ptB_Rx |
| Time Point 610(13) | TimeStamp13 | ptL_Rx |
| ... | | |
| Time Point 610(20) | TimeStamp20 | ptL_Rx |
| Time Point 610(21) | TimeStamp21 | ptB_Rx |
| ... | | |
| Time Point 610(N) | TimeStampN | ptA_Rx |

*Fig. 6A*

| Chronicler Object 530 | | |
|---|---|---|
| | Time Stamp 620 | Point Label 630 |
| Time Point 610(1) | TimeStamp1 | ptA_Tx |
| Time Point 610(2) | TimeStamp2 | ptB1 |
| Time Point 610(3) | TimeStamp3 | ptB2 |
| Time Point 610(4) | TimeStamp4 | ptC1 |
| Time Point 610(5) | TimeStamp5 | ptC2 |
| ... | | |
| Time Point 610(10) | TimeStamp10 | ptC1 |
| Time Point 610(11) | TimeStamp11 | ptC2 |
| Time Point 610(12) | TimeStamp12 | ptB1 |
| Time Point 610(13) | TimeStamp13 | ptB2 |
| Time Point 610(14) | TimeStamp14 | ptL1 |
| ... | | |
| Time Point 610(20) | TimeStamp20 | ptL2 |
| Time Point 610(21) | TimeStamp21 | ptB1 |
| Time Point 610(22) | TimeStamp22 | ptB2 |
| ... | | |
| Time Point 610(N) | TimeStampN | ptA_Rx |

*Fig. 6B*

Chronicler Object
810

| Time Point 812(1) | Point Label 814(1) | System_In |
| --- | --- | --- |
| | Time stamp 816(1) | 11:00:01 |

| Time Point 812(2) | Point Label 814(2) | Tariff_In |
| --- | --- | --- |
| | Time stamp 816(2) | 11:00:05 |

| Time Point 812(3) | Point Label 814(3) | Tariff_Out |
| --- | --- | --- |
| | Time stamp 816(3) | 11:00:08 |

| Time Point 812(4) | Point Label 814(4) | Session_Persistence_In |
| --- | --- | --- |
| | Time stamp 816(4) | 11:00:08 |

| Time Point 812(5) | Point Label 814(5) | Session_Persistence_Out |
| --- | --- | --- |
| | Time stamp 816(5) | 11:00:09 |

| Time Point 812(6) | Point Label 814(6) | System_Out |
| --- | --- | --- |
| | Time stamp 816(6) | 11:00:11 |

*Fig. 8B*

METHOD AND SYSTEM FOR LOW-OVERHEAD LATENCY PROFILING

CROSS-REFERENCE TO RELATED APPLICATIONS

The present patent application claims priority to Provisional Patent Application Ser. No. 61/908,596, filed Nov. 25, 2013, and entitled "Low Overhead Latency Profiling," which is hereby incorporated by reference herein, in its entirety and for all purposes.

FIELD OF THE INVENTION

The present disclosure relates to the measurement of computing systems' performance, and more particularly, to low-overhead latency profiling of computing systems.

BACKGROUND OF THE INVENTION

Service providers are experiencing ever-growing service usage by subscribers. A service provider typically employs computing systems that implement processing systems in which subscribers are charged for their service usage.

BRIEF DESCRIPTION OF THE DRAWINGS

The present invention may be better understood, and its numerous objects, features and advantages made apparent to those skilled in the art by referencing the accompanying drawings.

FIGS. 6A and 6B are simplified block diagrams illustrating example time points of chronicler objects, according to one embodiment.

FIG. 8B is a simplified block diagram illustrating components of an example chronicler object, according to one embodiment.

Figure 1A:
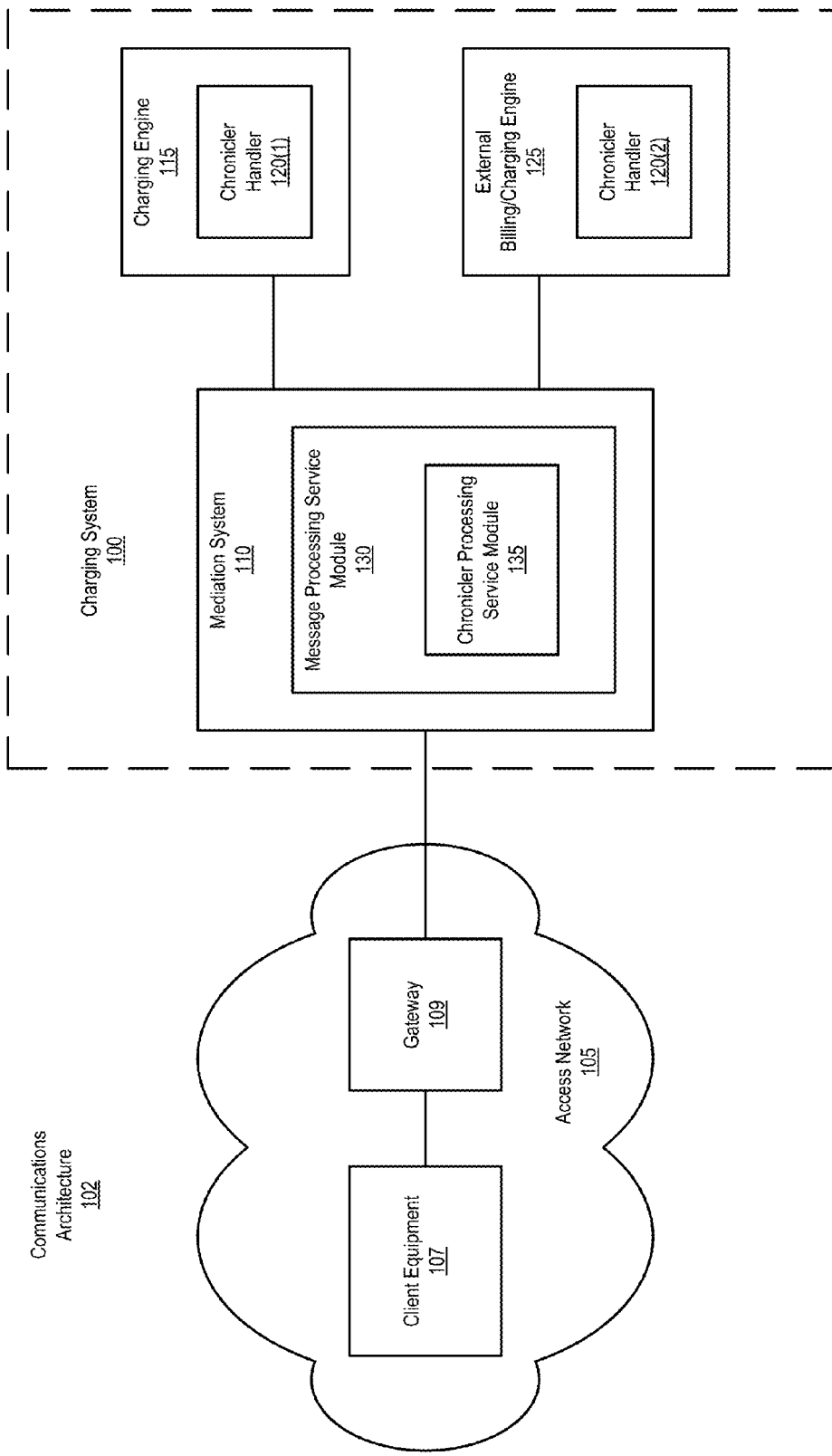
FIG. 1A is a simplified block diagram illustrating components of an example communications architecture in which a charging system of the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

Overview

The present disclosure describes examples of methods, non-transitory computer-readable storage media, and computer systems that implement efficient, effective approaches for measuring the performance of the hardware and software of processing systems (e.g., charging systems) that perform transaction processing operations. Methods and system employing techniques according to embodiments such as those described herein gather the requisite information by associating one or more measurement storage constructs (e.g., an object such as a chronicler object, described subsequently) with one or more transaction processing messages. In so doing, such measurement storage constructs can be sent along with (or even within) transaction processing messages that are to be processed by the transaction processing system. As a given transaction processing message (and its associated measurement storage construct) are processed by the transaction processing system (e.g., as the transaction processing message and measurement storage construct progress through the components of the transaction processing system), measurement information is stored in the measurement storage construct, at one or more points in the transaction processing system's process flow. Analysis is performed on the measurement information thus gathered only after the measurement storage construct has reached a certain point in the transaction processing system's process flow (e.g., after the transaction processing message has completed processing). As a result of the simplicity of such operations, the recordation of such measurement information can be implemented in a lightweight and low-overhead fashion, and only minimal computational resources are required for the transaction processing system to support such a measurement paradigm.

As will be appreciated, then, such approaches can be used to determine latencies experienced by and within a variety of computing systems. For example, such approaches can be used in the implementation of latency monitoring and reporting services that collect and report latencies experienced in the servicing of transactions in transaction-based systems such as those implemented by telecommunications providers (e.g., the charging systems used by carriers providing cellular telephone services). By including a measurement storage construct with transaction processing messages resulting from the receipt of usage requests by the provider's processing system, the service provider is able to gather information relevant to latencies, analyze that information, and make determinations as to the latencies experienced in the servicing of such usage requests.

To this end, a measurement storage construct (e.g., a chronicler object) can be generated and transmitted to a provider's processing systems (e.g., a telecommunications provider's charging engine). In such a scenario, the chronicler object collects information regarding latency (e.g., information regarding one or more points in time (time points)), as the chronicler object travels through one or more components of the charging engine. Upon the chronicler object's return, information regarding the time points is extracted from the chronicler object and added to a corresponding accumulator object, which will typically be one of some number of such objects. Each accumulator object aggregates (accumulates) time points from a number of chronicler objects received during a reporting window. The accumulation of such information facilitates calculation of the latency of various tasks and operations within the service transaction(s) in question. It should be mentioned that such latencies, depending on the configuration of the measurements thus taken, may reflect various performance metrics for various elements of the computing system under scrutiny, including software components, hardware components, and/or a combination thereof.

The performance and other benefits from such approaches are numerous. Among them, no calculations need be performed at the time of a given measurement's collection. Further, no storage is required of the processing system's components for storage of performance metrics when using such approaches, and the overhead involved is minimal—the only resources consumed in the processing system by such approaches are the minimal storage needed by the measurement storage construct itself and the processing needed for adding the requisite measurement information to the measurement storage construct. Such approaches therefore result in only negligible impacts on the processing system

EXAMPLE EMBODIMENTS

FIG. 1A is a simplified block diagram illustrating components of an example charging system 100 in a communications architecture 102, in which embodiments such as those described in the present disclosure can be implemented. A service provider (e.g., a telecommunication service provider, a shipping service provider, a utility service provider, and the like) provides subscribers with access to one or more service products. A service provider can implement a charging system 100 that is configured to define and enforce conditions indicating how subscribers should be charged for service usage. As illustrated, charging system 100 includes an access network 105, a mediation system 110, a charging engine 115, and/or an external billing/charging engine 125. Access network 105 includes one or more user equipment 107 and one or more gateways 109. Each of these components is discussed below.

User equipment 107 is, for example, a computing device of a subscriber (or a user of a service). Examples of user equipment 107 include computing devices (e.g., a mobile phone, a smartphone, a tablet computer, a laptop computer), a terminal device, a kiosk, and other such devices that can be used to access a service. Computing devices are further discussed below in connection with FIG. 11. User equipment 107 is configured to communicate with mediation system 110 via gateway 109 in access network 105. Examples of access network 105 include an IP (Internet Protocol) network, a telecommunications network, or other network that provides a subscriber with connectivity to mediation system 110. Examples of gateway 109 include a computing device, such as a server or switch device that is communicatively coupled to mediation system 110. Although only single ones of user equipment 107 and gateway 109 are illustrated in FIG. 1, multiple ones of user equipment 107 and gateway 109 can be implemented in access network 105.

Charging engine 115 is configured to perform calculation of charges that arise from a subscriber's service usage. Charging engine 115 can be implemented on one or more processing nodes, where the one or more processing nodes are implemented on one or more servers (such as on a grid-based high availability cluster of servers), where a server can be implemented on one or more computing devices. Charging engine 115 includes one or more charging components, each of which is responsible for performing a portion of the calculations needed to charge the subscriber for service usage. The charging components of charging engine 115 can be implemented on the one or more processing nodes of charging engine 115. An example charging system may implement a policy and charging control solution, such as that developed under 3GPP™ (3rd Generation Partnership Project) IMS (Internet Protocol Multimedia Subsystems) and provides a new standard for charging system business models.

External billing engine and/or charging engine 125 may optionally be implemented in charging system 100. If implemented in charging system 100, external billing/charging engine 125 is distinct from charging engine 115 and is configured to perform billing of charges for subscribers and/or additional calculation of charges that arise from a subscriber's service usage. External billing engine/charging engine 125 can be implemented on one or more processing nodes, where the one or more processing nodes are implemented on one or more servers (such as on a grid-based high availability cluster of servers), where a server can be implemented using one or more computing devices. External billing/charging engine 125 also includes one or more charging components, each of which is responsible for performing a portion of the calculations needed to bill and/or additionally charge the subscriber for service usage. The charging components of external billing/charging engine 125 can be implemented on the one or more processing nodes of external billing/charging engine 125. Use of the term "charging engine" herein generally refers to a charging engine implemented in a charging system such as charging system 100, which includes charging engine 115 and external billing/charging engine 125.

Mediation system 110 can be implemented on one or more servers, where a server can be implemented on one or more computing devices. Mediation system 110 is communicatively coupled to both charging engine 115 and external billing/charging engine 125. When a subscriber wishes to utilize a service, the subscriber's user equipment (depicted in FIG. 1A as user equipment 107) sends a request for the service (a service request) to mediation system 110 via gateway 109. Message processing service module 130 receives a usage request, and, in turn, generates a corresponding usage request message and routes the usage request message to the appropriate charging component(s) of charging engine 115 or external billing/charging engine 125, for example. Each such charging request message can include, for example, a payload that contains information in the form of attributes regarding the subscriber's service usage, such as the type of service being utilized and service usage parameters (e.g., volume-, time-, or event-based service usage parameters). Charging engine 115 and external billing/charging engine 125 are configured to utilize information in the payload to perform authentication, authorization, and/or accounting operations, such as initiating usage, authorizing further usage, terminating usage, charging the subscriber's account for service usage, and so on.

Service providers strive to provide a quality service experience to subscribers. Service providers can measure the quality of a service by measuring various objective aspects of the service, such as by monitoring certain performance metrics that reflect the quality of the provided service. Example performance metrics include bandwidth (e.g., maximum rate of information transferred), throughput (e.g., actual rate of information transferred), latency (e.g., the time consumed by a given operation (e.g., between its commencement and completion), such as the time between sending a subscriber's request and receiving a response thereto), jitter (e.g., variation in the occurrence of a repetitive event, such as the arrival time of certain information), and error rate (e.g., number of corrupted bits as a percentage of total bits sent). Service providers often assure subscribers of a certain level of quality in their user experience by specifying ranges or limits of a number of performance metrics in a service level agreement (SLA), where the performance metrics define a minimum guaranteed level of quality for the provided service.

A service provider can, for example, monitor the performance metrics of a charging system to determine whether the minimum guaranteed level of quality is being met. For many service providers, monitoring latency is important because service quality is dependent upon the speed with which a service transaction (or an exchange of a usage request message and a usage response message) is completed, such as a service that cannot be provided to a subscriber until the subscriber or particular service usage (e.g., an event) is authorized by the charging engine. For example, a subscriber may not be able to make a cell phone call under a pre-paid service plan until the charging engine verifies that the subscriber has enough credit to initiate the call. In such a charging regime, a service provider may define performance criteria such as a maximum service transaction latency time of 50 milliseconds in the charging system, where latency of a service transaction is measured from the time a service request is sent to the charging engine from the mediation system until the time a corresponding service response is received at the mediation system from the charging engine.

While a service provider could implement a monitoring system in the charging system to monitor various performance metrics and to determine whether performance criteria are being met, doing so would result in unacceptably long delays and ever-increasing resource requirements. Such monitoring would introduce additional processing overhead at the charging engine, in order to monitor latency and throughput of service transactions, which greatly slows the charging operations and associated processing performed by the charging engine, causing the latency times to lengthen and throughput levels to fall. Further in this regard, the additional overhead involved in such approaches risks skewing the resulting measurements thus taken, making such measurements suspect from the outset. Further still, it desirable to be able to provide instrumentation in processing systems such as those described herein, which allows for the monitoring of latency information in a runtime environment (also referred to as a production environment) in a fashion comparable to the operation of such functionalities in a test ("debug") environment. Particularly, the ability to gather such information in a low-overhead manner, such that the processing operations performed by the processing system are not noticeably impacted, and performance criteria (e.g., such as might be set forth in one or more applicable SLAs) are met, is also strongly preferred. Also desirable is the ability to gather latency between any two (or more) point in the processing system, for purposes of demonstrating compliance with the applicable SLAs, determining system performance generally, identifying problem components (e.g., one or more components creating unacceptable or unexpected delays), and the like. Moreover, the ability to easily and quickly switch between such environments (e.g., test and production environments, and vice versa) is also desirable (e.g., to allow for the testing of new processing components, and then the introduction (and monitoring) of such new processing components into a production environment). In this regard, the ability to monitor processing components in a production environment, and change the metrics thus monitored dynamically, without having to shut down the processing system is also highly desirable. Systems according to embodiments such as those described in the present disclosure offer these and many other features and advantages, as will be apparent in light of the present disclosure.

Moreover, as the number of subscribers increases, the number of service transactions that are processed by the charging engine also increases, which in turn requires additional (and expensive) computing resources to monitor the latency of those service transactions. As a result, a monitoring system implemented in the charging system would result in exponentially-increasing processing latencies, as the number of subscribers (and so service transactions) grew. For example, with 10 subscribers executing 10 service transactions each, 100 total service transactions would need to be processed (and profiled). With 10 times that number of subscribers (100 subscribers) and service transactions (100 per subscriber), the total number of service transactions balloons to 10,000. The problems caused by such exponential growth are only compounded when the need to service such service transactions quickly is taken into account (e.g., within the relevant time constraints, such as the 50 ms, 230 ms, and 2 s constraints mandated to avoid Carrier Group Alarms (CGAs) in the case of voice telephone calls adhering to various relevant standards (e.g., including, but not limited to, 3GPP™ IMS (and more particularly, 3GPP™ (Phases 1 and 2, and Releases 96-99 and 4-11)), Bell Communications Research (Bellcore; now Telcordia) General Requirements and Industry Standards (GR) GR-499, Bellcore GR-253 (including GR-253: *Synchronous Optical Network (SONET) Transport Systems*, Common Generic Criteria, Issue 5 [Bellcore, October 2009]), and ANSI (American National Standards Institute) T1.102, and the timing requirements therein, all of which are included herein by reference, in their entirety and for all purposes). If additional resources are not added in such situations, the processing overhead incurred while monitoring latency of an ever-greater number of service transactions grows concomitantly, thus slowing the charging processing of the service transactions, lengthening latency times, and reducing throughput. And while attempts can be made to reduce the additional processing overhead by sampling (monitoring a subset of) the service requests being processed by the charging engine, such a monitoring system does not report the latencies of 100% of the service requests being processed and thus cannot verify whether the guaranteed level of service is met 100% of the time. Thus, in the case of time-critical services (e.g., voice telephone communications), the number of subscribers and service requests, along with the requirements of the relevant standards, quickly results in situations that even automated (e.g., computerized) alternative approaches becoming unworkable. These and other limitations and problems are addressed by systems according to the present disclosure.

The present disclosure provides a latency measurement, monitoring, and reporting solution that can be easily integrated with the charging engine to minimize the processing overhead incurred by the charging engine when monitoring and reporting the latency of service transactions (measured from when a usage request message is transmitted to a charging engine until a corresponding usage response message is received from the charging engine) and/or relevant portions thereof. Measurements can be taken at any point in the process of servicing a request (referred to herein as interception points) using any number techniques such as those described herein. That being the case, and as will be appreciated in view of the present disclosure, it is desirable to select interception points within the process that are meaningful with respect to the functions, tasks, and operations being performed. That is, interception points are best chosen that reflect the latency experienced in a particular conceptual (and, at least potentially, programmatic, and/or physical) unit or subunit of the process in question. For example, while the latency experienced between the receipt of a usage request and a response thereto is meaningful both conceptually and practically, it is likely that the latency experienced in the functions, tasks, and operations that make up the servicing of a usage request will also be of interest. By allowing the placement of interception points at any point within the process flow of servicing such a usage request, techniques such as those described herein offer an extremely flexible approach to determining any number of latencies within such a process flow (whether using interception points to identify the various functions, tasks, and operations thereof, or otherwise).

Approaches according to embodiments of the systems described in the present disclosure can thus be implemented by way of a chronicler processing service module 135 (which can be implemented, as shown, as part of message processing service module 130 on mediation system 110, or on gateway 109, for example). Typically, in order to minimize the impact on the components of charging engine 115 and/or external billing/charging engine 125, interception points are simply defined in the process flow in question, and the requisite information is written into the given chronicler object (e.g., interception point label and timestamp (e.g., time at which the message was processed at, passed through, or otherwise encountered the interception point)). The recordation of such information can be performed by one or more objects within the message (e.g., a tracking context object, described subsequently) or by instructions/modules within charging engine 115 and/or external billing/charging engine 125, or one or more of their components. Alternatively, specific programmatic constructs (e.g., a chronicler handler) can be integrated into the components of charging engine 115 and/or external billing/charging engine 125 (and depicted in FIG. 1A as chronicler handlers 120(1) and 120(2)).

For a usage request destined for charging engine 115, a chronicler object is generated by chronicler processing service module 135 and included in (or otherwise associated with) the usage request message. The chronicler object thus generated is included in the usage request message, and the usage request message sent to the charging engine. As the usage request message is processed by the various components of charging engine 115 (or external billing/charging engine 125), the chronicler object collects time points from the various components of charging engine 115 (or external billing/charging engine 125) at the interception points defined therein. The chronicler object is returned to the mediation system with a usage response message generated by charging engine (or external billing/charging engine 125) in response to the usage request message. Chronicler processing service module 135 harvests (extracts) the information included in the chronicler object (e.g., labels and timestamps), aggregating (accumulating) such information for use in determining the latency of the service transaction and/or portions thereof. This allows for the evaluation and analysis of up to and including 100% of the latencies experienced by service transactions and/or portions thereof performed by charging system 115 (or external billing/charging engine 125), facilitating the generation of reports reflecting such metrics (in real time, on a historical basis, or a combination of the two). Such reporting, particularly in a graphical format, allows for simply and easy determination as to whether performance criteria are being met, for example. Chronicler processing service module 135 is further discussed below in connection with FIG. 2.

Mediation system 110 can be communicatively coupled to gateway 109, charging engine 115, and/or external billing/charging engine 125 via, for example, one or more IP (Internet Protocol) networks that utilize a communications protocol such as Ethernet, IEEE 802.11x, or some other communications protocol. In light of the present disclosure, it will be appreciated that charging system 100 and access network 105 can include other components such as base stations, access gateways, serving gateways, IP networks, servers, routers, switches, firewalls, and the like that are not germane to the discussion of the present disclosure and will not be discussed in detail herein. It will also be appreciated that other configurations are possible. For example, a large number of distinct user equipment devices and gateways can be implemented in access network 105. Further, charging system 100 may also include additional components not illustrated. Also, a repository and/or a data store discussed herein can be implemented using one or more storage devices (e.g., a single storage device or a collection of storage devices). A storage device can be implemented using network attached storage (NAS), file servers, storage filers, a storage area network (SAN), and the like.

However, regardless of the technologies used to implement the processing system, latency monitoring systems according to embodiments such as those described herein provide for such monitoring in an efficient, low-overhead manner. For example, the chronicler objects described herein can be designed for a predefined set of interception points, as a static construct, requiring only the storage of timestamps therein. Further, such interception points, even if predefined, can still be switched on and off, allowing additional efficiencies to be achieved. As will be appreciated in light of the present disclosure, the requisite operating condition information can be stored in a given chronicler object in a number of ways. For example, the chronicler object itself can include functionality designed to make a determination as to the point(s) at which interception point information is to be gathered, and effect such gathering (e.g., the storage of a timestamp and, optionally, interception point label at a given interception point). Alternatively, the construct within which a chronicler object might be inserted (referred to herein as an envelope) can include such functionality, allowing for the detection of the desired interception points and, at such appropriate juncture, performance of the requisite operation(s) upon the envelope (and so chronicler object) carried out. Another alternative is to include chronicler modules in the processing system and/or its components. While less desirable, due to the need for additional functionality is the processing system and/or its components and the computational resources involved, the lightweight nature of constructs such as the chronicler objects described herein would still minimize the computational resource requirements of even this approach.

Given the minimal information conveyed with a given chronicler object and the minimal processing needed to process such chronicler objects, approaches according to methods and systems such as those described herein provide efficient, effective, flexible monitoring of operating parameters such as processing latency. As will be appreciated in light of the present disclosure, such operating parameters, while discussed in terms of processing latencies (e.g., by way of the gathering and aggregation of timing information such as timestamps), approaches according to methods and systems such as those described herein can be used to monitor all manner of operating parameters extant within the processing system and/or its components. That is, operating parameters either already maintained by the processing system and/or its components (or that which can be easily added to the functionality thereof, and which requires only minimal processing (if any, such as to meet such desirable conditions as those described earlier with regard to SLAs and other such criteria) can serve as the basis for monitoring such operating conditions within the processing system and/or its components. For example, if a given operating parameter (e.g., percent usage, uptime, mean-time-between-failures, network device information, Self-Monitoring, Analysis and Reporting Technology (SMART) information in hard drives, and other such operating condition information) are maintained in the software and/or hardware of the given processing system and/or its components, then storing such information in a given chronicler object, and thus, the collection of such operating information, can be realized using approaches according to methods and systems such as those described herein. These and other such possible application will be apparent in view of the methods and systems described herein.

The nature of modern online transaction processing (OLTP) systems, of which the charging systems discussed herein are but one example, is such that the workload cannot be fulfilled within a single computer. Therefore, most modern real-life applications are distributed: processing is performed in multiple processes and/or on multiple servers. One example is the scenario in which a processing system (e.g., a charging system) processes transactions (e.g., a single cellular telephone call). In such a scenario, the charging system may perform a number of operations in response to a usage request. Once the charging system receives the request, the charging system identifies the subscriber and the subscriber's rate plan. The charging system then calculates charges related to the usage request, and then saves state information regarding the session. Having performed these operations, the charging system then prepares a response to be sent to the subscriber (in fact, the infrastructure the subscriber is using to place the call). In the context of a distributed system, this flow can be implemented in a number of ways. As a result, a variety of processing system architectures can be employed, examples of which are now presented.

Figure 1B:
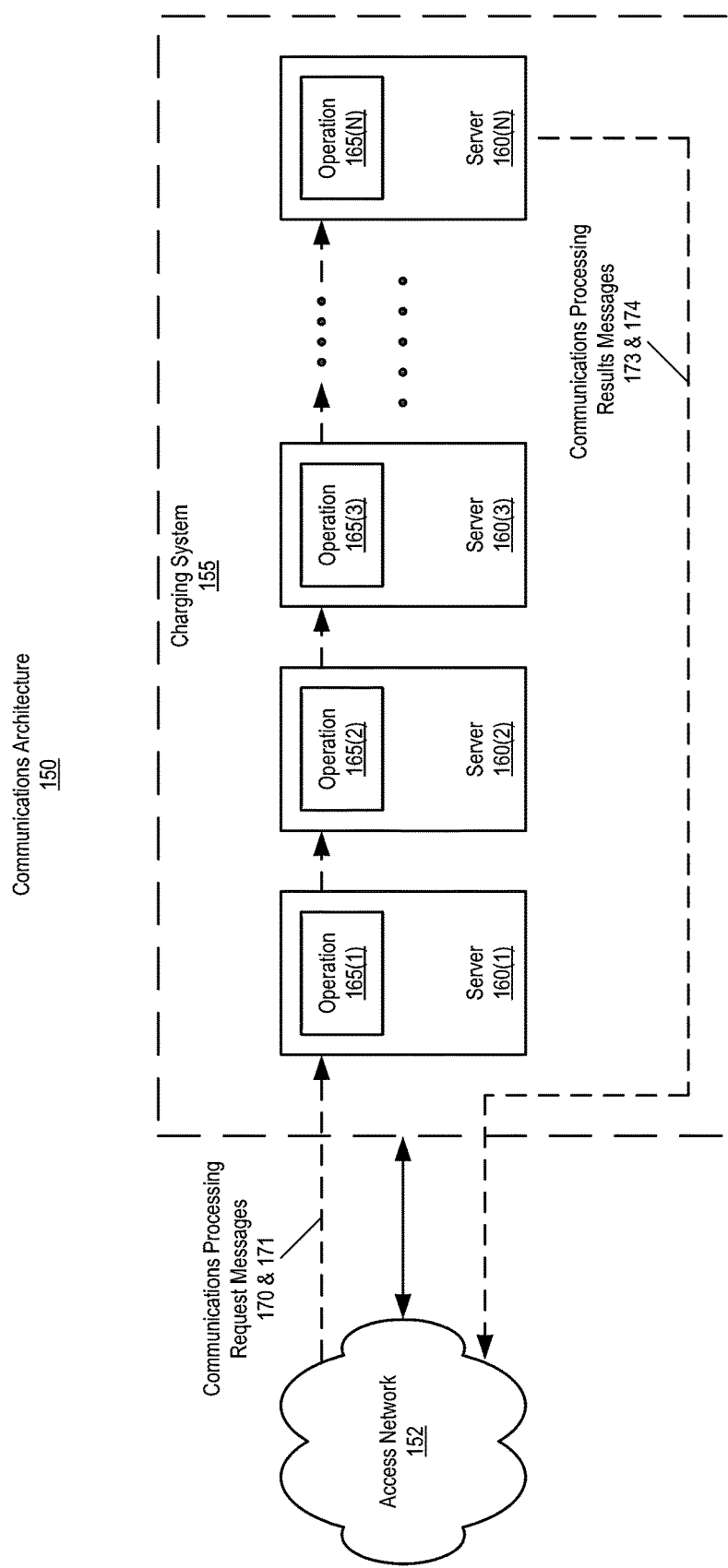
FIG. 1B is a simplified block diagram illustrating components of another example communications architecture, in which the present disclosure can be implemented, according to one embodiment.

FIG. 1B is a simplified block diagram illustrating components of an example communications architecture, in which the present disclosure can be implemented, according to one embodiment. A communications architecture 150 is thus depicted in FIG. 1B, and includes an access network 152 communicatively coupled to a charging system 155. In view of the present disclosure, it will be appreciated that, while communications architecture 150 is described in terms of a charging system (and thus, certain components included in the internal architecture of charging system 155), such features serve only as an example, and that communications architecture 150 is intended to serve as an example of the kinds of computing architectures in which embodiments of the systems described herein can be implemented As can be seen, charging system 155 includes a number of elements, including a number of servers (depicted in FIG. 1B as servers 160(1)-(N). In performing charging operations, in the example depicted in FIG. 1B, each of servers 160(1)-(N) is tasked with performing one more operations in the billing and revenue management operations supported by charging system 155. That being the case, each of servers 160(1)-(N) is responsible for one or more operations in this example of a billing and revenue management process. Such operations are depicted in FIG. 1B, for example, as corresponding ones of operations 165(1)-(N). It will be appreciated that, while operations 165(1)-(N) are shown as corresponding to servers 160(1)-(N) on a one-to-one basis, such illustration is merely for example, and numerous other alternatives will be apparent in light of the present disclosure. In fact, the letter N is used in the present disclosure to indicate a variable number of devices or components that are discussed herein. For example, a variable number of servers 160(1)-(N) can be implemented in charging system 155. Although the letter N is used in describing a variable number of instances of each of these different devices and components herein (as is M and other such designators), a repeated use thereof does not necessarily indicate that each device and component has a same number of instances implemented in the system in question, or any other of the systems described herein.

In operation, charging system 155 receives one or more communications processing request messages from access network 152, which charging system 155 processes on behalf of the entities within access network 152 requesting to use the facilities thereof, in order to provide those entities with one or more results (e.g., approval to use such facilities). Thus, as is depicted in FIG. 1B, entities within access network 152 send communications processing request messages (depicted in FIG. 1B as communications processing request messages 170 and 171) to charging system 155. Communications processing request messages 170 and 171 are then processed by the various servers within charging system 155, which perform the requisite operations needed to provide the entities within access network 152 with the requisite information, approval, and/or the like (depicted in FIG. 1B as communications processing results messages 173 and 174). To that end, server 160(1) performs operation 165(1), server 160(2) performs operation 165(2), server 160(3) performs operation 165(3), and so on, until communications processing results messages 173 and 174 are generated. Charging system 155 then provides communications processing results messages 173 and 174 to the requesting entities in access network 152.

As will be appreciated in light of the present disclosure, communications architecture 150, and more specifically charging system 155, are designed to receive and process communications processing messages such as communications processing request messages 170 and 171 in a serial fashion, and, having done so, generate charging results such as communications processing results messages 173 and 174, in that order. However, communications processing messages such as communications processing request messages 170 and 171 can, in fact, be processed concurrently, as demonstrated by the communications architecture described in connection with FIG. 1C (or as a combination thereof, it should be noted).

Figure 1C:
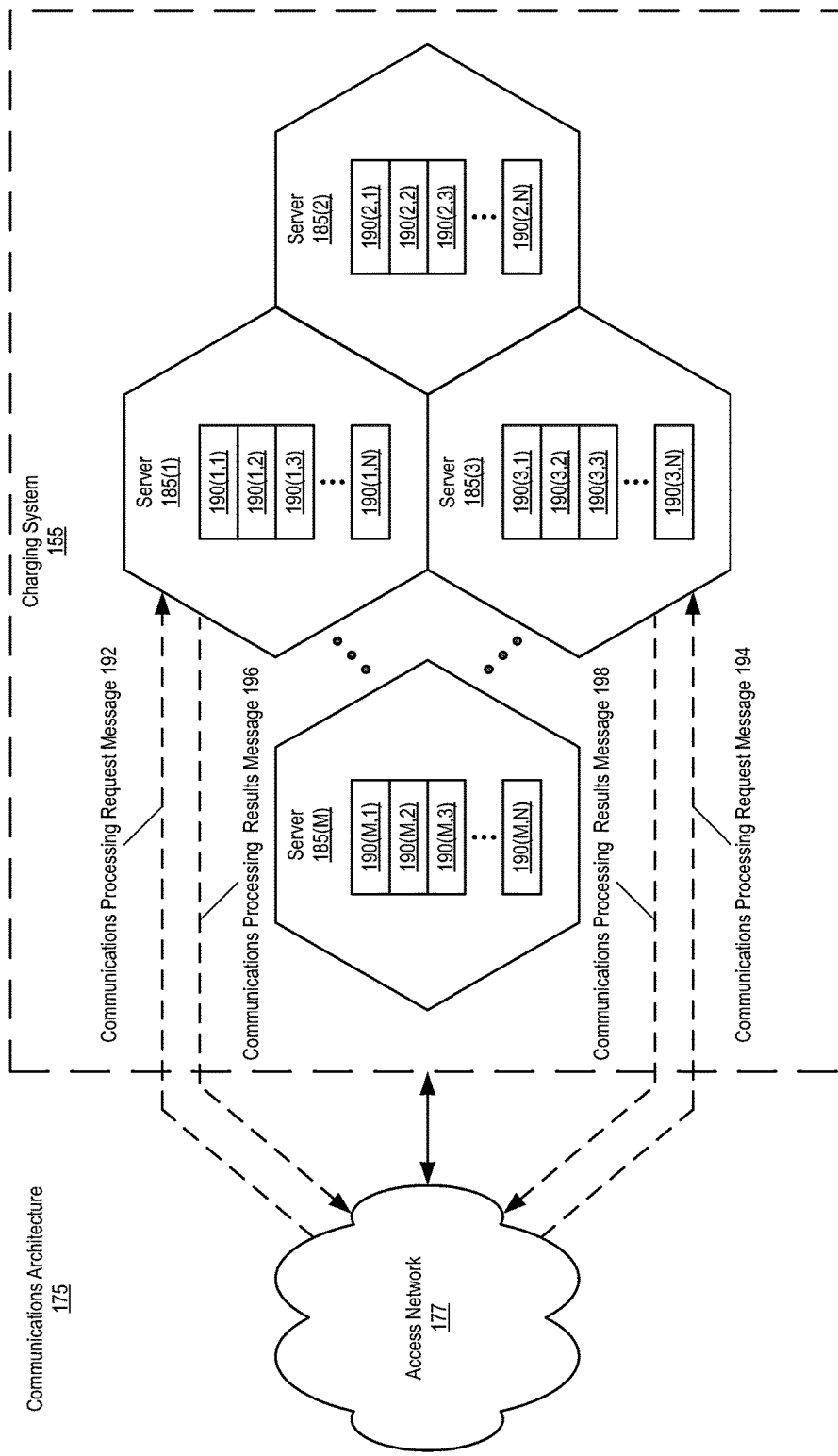
FIG. 1C is a simplified block diagram illustrating components of still another example communications architecture, in which the present disclosure can be implemented, according to one embodiment.

FIG. 1C is a simplified block diagram illustrating components of an example communications architecture, in which the present disclosure can be implemented, according to one embodiment. The communications architecture illustrated in FIG. 1C (and depicted in FIG. 1C as a communications architecture 175) employs a cluster of servers, each of which is capable of performing one or more (or all) of the requisite operations needed to process communications processing request messages received and generate communications processing results therefrom. Thus, as before, communications architecture 175 includes an access network 177 and a charging system 180. In turn, charging system 180 includes a cluster of servers, which are communicatively coupled to one another to allow communication therebetween and facilitate global management thereof (depicted in FIG. 1C as servers 185(1)-(M)). As noted, each of servers 185(1)-(M) is capable of performing some or all of the operations requisite to one or more given tasks for which a given one of servers 185(1)-(M) might be assigned. In the example presented in FIG. 1C, each of servers 185(1)-(M) is assigned some number of operations to perform to accomplish their assigned tasks. Thus, for example, server 185(1) performs a number of operations (depicted in FIG. 1C as operations 190(1,1)-(1,N). Servers 185(2)-(M), similarly, perform operations associated with the tasks for which servers 185(2)-(M) are responsible (depicted in FIG. 1C as operations 190(2,1)-(M,N)).

In operation, communications architecture 175, and more specifically charging system 180, receive communications processing request messages, and, after performing the processing requested by the communications processing request messages, generate communications processing results in response thereto. Such exchanges are thus depicted in FIG. 1C as charging system 180 receiving communications processing request messages 192 and 194 from access network 177, at servers 185(1) and 185(3). In response to communications processing request messages 192 and 194, servers 185(1) and 185(3) generate communications processing results messages 196 and 198, which are then sent by charging system 180 to various entities within access network 177. In contrast to the approach taken in communications architecture 150 of FIG. 1B, communications architecture 175, and more specifically charging system 180, are able to process communications processing request messages such as communications processing request messages 192 and 194 concurrently. Thus, communications processing request message 192 might be routed to server 185(1), at which juncture operations 190(1,1)-(N,1) are performed, in order to generate communications processing results messages 196. Similarly, communications processing messages 194 can be routed to, for example, server 185(3), at which juncture the requisite operations (operations 190(1, 3)-(N, 3)) are performed, in order to generate charging results 198, which are then sent from charging system 180 to the appropriate entities within access network 177.

The distributed nature of communications architectures 150 and 175 pose numerous technical challenges to the monitoring and gathering of performance metrics and other information. If each server were made to collect and store a history of such metrics, to be later queried individually (and particularly if such systems were also made responsible for summarization of such results), a significant impact on throughput and computational resources will be experienced by the processing systems. While such impacts might somehow be endured in a test setting, for a production system, such an approach would clearly be unsuitable, since storage of metrics consume valuable memory used for regular processing, and their analysis and calculations would consume unacceptable levels of processing resources. Approaches such as those described herein addresses such challenges, and outline simple techniques for collecting performance metrics data (particularly from a distributed system), without incurring overhead that would affect regular transaction processing.

As noted, either of communications architectures 150 or 175 can be employed in satisfying communications processing requests. Further, as noted briefly above, some combination of such architectures can be employed, depending on the application and other details of the given situation. Further, other architectures (not shown) can also be employed to good effect. While the many benefits of systems according to the present disclosure will be evident in light of the present disclosure, it should be appreciated that the more complex the architecture, the greater the benefits of the low-overhead nature of such systems.

Figure 2:
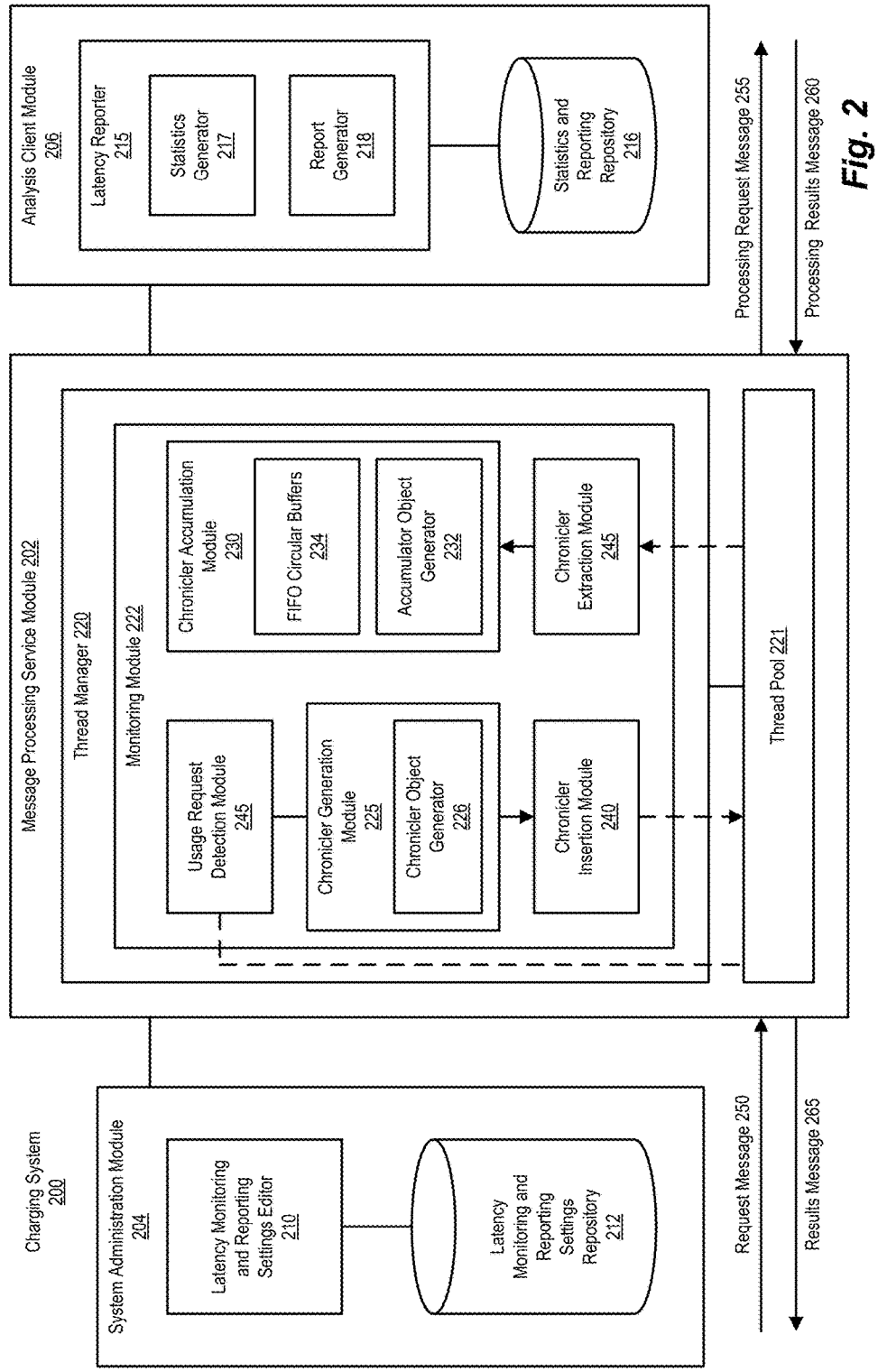
FIG. 2 is a simplified block diagram illustrating components of an example chronicler processing service module in which the present disclosure can be implemented, according to one embodiment.

FIG. 2 is a simplified block diagram of a charging system 200 illustrating components of an example message processing service module such as message processing service module 130 of FIG. 1A. This example (depicted in FIG. 2 as a message processing service module 202). In addition to message processing service module 202, charging system 200 also includes a system administration module 204 and an analysis client module 206. System administration module 204, in turn, includes a latency monitoring and reporting settings editor 210 and a latency monitoring and reporting settings repository 212. System administration module 204 is coupled to message processing service module 202 and thereby supports the configuration of the components of message processing service module 202, in order to configure such components to gather information relevant to the latencies experienced by and within processing systems such as charging system 100 (or at least, cause such information to be gathered). As or after the components of message processing service module 202 gather such information, the components of analysis client module 206 facilitate the processing, analysis, and display of such information. To this end, analysis client module 206 includes a latency reporter 215, which is coupled to a statistics and reporting repository 216. Latency reporter 215, in turn, includes a statistics generator 217 and a report generator 218. These components provide support for obtaining, processing, and analyzing information regarding latencies gathered by the chroniclers generated, sent, received, and aggregated by message processing service module 202.

Message processing service module 202 includes a thread manager 220 communicatively coupled to a thread pool 221. Among other functions, thread manager 220 serves to manage the threads in thread pool 221 (e.g., the creation, maintenance, and destruction of threads in execution in thread pool 221), and supports functionality related to the monitoring of latencies via its inclusion of a monitoring module 222. Monitoring module 222 includes a usage request detection module 224, a chronicler generation module 225 (with the actual generation of chronicler objects being handled by a chronicler object generator 226 therein), and a chronicler accumulation module 230. Chronicler accumulation module 230 includes an accumulator object generator 232 and one or more FIFO (first in first out) circular buffers 234. Accumulator object generator 232 is configured to create accumulator objects, manage those accumulator objects (including accumulating interception point information from received chronicler objects into accumulator objects), and passing accumulator objects to FIFO circular buffers 234. FIFO circular buffers 234 are configured to receive and store a number of accumulator objects. Chronicler accumulation module 230 is further discussed below in connection with FIG. 3B and FIG. 7A-7B.

Also included in monitoring module 222 is a chronicler insertion module 240 (which inserts the chronicler objects created by chronicler generation module 225 into processing request messages sent to the given processing system (e.g., charging engine 115) by message processing service module 202) and a chronicler extraction module 245 (which extracts chronicler objects from processing results messages received from the given processing system (e.g., charging engine 115)).

In operation latency monitoring and reporting settings editor 210 of system administration module 204 provides a user interface (e.g., a graphical user interface (GUI) or a text-based user interface such as a command line interface (CLI)) that is configured to display information entered (e.g., typed on a keyboard or selected from a GUI element, such as a drop down menu or graphical icon) by an administrator. Such user interfaces allow an administrator to utilize latency monitoring and reporting settings editor 210 to define and maintain settings used by a latency monitoring service, such as monitoring module 222, implemented to monitor latencies in processing systems such as charging engine 115 and external billing/charging engine 125 of FIG. 1A. In the alternative (or in combination, as noted in connection with FIG. 1A), such functionality can be implemented within such processing systems by instrumenting such systems with chronicler handlers (e.g., chronicler handlers 120(1) and 120(2)), which can be configured to update chroniclers processed in such systems with the requisite information, and which can be implemented as plug-ins or other software framework extensions implemented therein.

A message processing service module (e.g., message processing service module 202 or message processing service module 130) monitors latency of messages processed by a charging engine using chronicler objects associated with those messages and information added thereto at interception points at various points of the process flows within the processing systems being analyzed (e.g., such as at the entry/exit points of the various components of a charging engine). An interception point can be defined (or at least, switched on and off) by the administrator in the latency monitoring settings in question, and indicates a point in the processing of a processing message at which the interception point is crossed, and thus, the chronicler object should be considered "intercepted" (i.e., the point at which interception point information should be written to the chronicler object). For example, an interception point can be defined as the point at which the message (request or response) is received at the interception point (a "receiving interception point"), which might occur, for example. upon receipt of the message (and so, chronicler object) at a component of the charging engine (e.g., upon receipt at an incoming port of the charging component). Alternatively, an interception point can be defined as the point at which the message departs the given interception point (a "transmitting interception point"), which occurs after a charging process or sub-process is performed by the charging component (e.g., upon receipt at an outgoing port of the charging component). Combinations of such points can also be employed, as can definitions in which an interception point occurs within a given process or sub-process, the point here being that interception points can be placed at any point in the process flow. In other words, the programmatic code of the processing system can be "instrumented" in any way, and certainly in any way an administrator might desire. Interception points are further discussed below in connection with FIG. 5A-5B, among others.

Once intercepted, a chronicler object such as those described herein is updated with the requisite information. For example, such operations can include the insertion of a label (e.g., an interception point label) and timestamp into the chronicler object. Also referred to herein as a time point, such a timestamp indicates the time at which a message (and so, its associated chronicler object) is received at, transmitted from, and/or otherwise processed by a particular charging component. Time points can be used to determine the latency (or length of time) involved in the message's progress from one point to another, in the process flow of the processing of a service transaction. The measurement of such latency times can, for example, begin with the transmission of a usage request message to the charging engine, and end when a corresponding usage response message is returned to the mediation system. Given that interception points can be instrumented anywhere in the processing system, it will be appreciated that greater granularity in determining latency times is not only possible, be easily and effectively implemented using techniques such as those described herein. The insertion of time points at interception points within the charging engine is a simple operation, and thus incurs comparatively little overhead, particularly when compared to traditional methods of latency monitoring. Time points are further discussed below in connection with FIG. 6A-6B, among others.

An administrator can define the settings of a latency monitoring service using latency monitoring and reporting settings editor 210, which includes turning the latency monitoring service on or off, turning various interception points on or off, specifying a monitoring percentage of the usage request messages, and specifying the type of time points to be monitored. Various settings of the latency monitoring service can be stored as latency monitoring profiles in latency monitoring and reporting settings repository 212, which is a database or other organized collection of data stored on a storage device. An administrator can tailor the latency monitoring settings to meet the administrator's latency monitoring needs (e.g., to allow the administrator to determine system performance in view of applicable SLAs).

Latency monitoring profiles can be directed to different levels or approaches to latency monitoring. In each profile, an administrator can switch certain interception points on/off, or otherwise configure a particular number of interception points that are located at or within a particular subset of charging components. A simple monitoring profile measures latency between the time a chronicler object leaves the mediation system (or leaves an initial transmission point) and the time the chronicler object returns to the mediation system (or returns to a final receiving point). In such a scenario, no interception points internal to the charging engine are switched on.

An administrator can also define a monitoring percentage (up to 100%) used to select a subset of the usage request messages, which can then be used to sample the latency of the usage request messages. Chronicler generation module 225 (discussed below) can be configured to implement the specified monitoring percentage according to the presently implemented latency monitoring profile. Chronicler processing service module 135 is configured to generate chronicler objects for a subset of usage request messages, which may include as much as 100% of usage request messages. For example, an administrator may define a base level monitoring profile that is used to monitor the latency of 25% of the usage request messages, where chronicler objects are generated for (approximately) 25% of all usage request messages transmitted to the charging engine (e.g., chronicler generation module 225 is configured to generate a chronicler object for every fourth usage request message transmitted to the charging engine). An example base level monitoring profile can also turn on a few key interception points (e.g., interception points located at charging components that greatly affect how usage request messages are processed during high demand). A base level monitoring profile may be beneficial for use in a charging system that has recently been determined to be meeting its performance criteria.

An administrator can also define various rules indicating when particular latency profiles should be used, in response to whether performance criteria are missed or in response to scheduled monitoring activities (e.g., a particular monitoring profile is used at peak times of charging engine usage). For example, if the latency monitored using the base level monitoring profile fails to meet a performance criterion of latency under 50 milliseconds, the latency monitoring service should switch over to (or activate) a higher level monitoring profile, in which additional messages and/or interception points in the system are monitored. For example, a higher level monitoring profile can be used to monitor the latency of 75% of the usage request messages at additional interception points in the charging engine in order to determine which charging component(s) might be the cause of a failure to meet performance criteria. Once points of poor performance have been identified, a focused monitoring profile can be activated to turn on particular interception points directed to the suspected charging component, in order to more specifically monitor the point at which a slowdown occurs and determine a cause of a failed performance criterion. For example, a charging component may fail to meet performance criteria due to slow processing, or transmission lines may fail to meet performance criteria due to bandwidth issues and/or line failure. A focused level monitoring profile can also be used to confirm whether improvements made in the charging engine are having their desired effect.

Turning the latency monitoring service off indicates that all interception points are turned off and that no chronicler objects are generated, which also indicates that no chronicler objects are intercepted. Turning the latency monitoring service on indicates that the service is being provided according to at least one latency monitoring profile. As particular monitoring profiles are activated by the administrator or by the latency monitoring service, chronicler objects are generated and updated at the appropriate interception points. In some embodiments, the mere generation of service request messages including chronicler objects, when sent to the processing system in question, cause the requisite information to be gathered. Alternatively, if chronicler handlers are implemented, the chronicler processing service module can inform the chronicler handlers of the present latency monitoring settings. In the latter case, for example, a chronicler processing service module utilizes a management framework extension to exchange settings messages with the chronicler handler. Settings messages inform the chronicler handler of active interception points where the chronicler handler should intercept chronicler objects, as well as the type of time point to insert into the chronicler objects, according to the presently implemented latency monitoring profile.

In addition to being configured to manage the threads in thread pool 221, thread manager 220 is also configured to manage the generation and accumulation of chronicler objects by virtue of including one or more instances of chronicler generation module 225 and chronicler accumulation module 230. Thread manager 220 is configured to instantiate one or more threads, each of which is devoted to the execution of one (or possibly more) process flow(s) related to the processing and/or fulfillment (or denial) of one (or possibly more) usage request(s). Chronicler generation module 225 and chronicler accumulation module 230, for their part, handle the generation of chronicler objects (e.g., in response to a notification from usage request detection module 245, as received from thread pool 221 (and as depicted in FIG. 2) and accumulation of interception point information (that can ultimately be used to produce latency information for analysis). Typically, the number of threads needed is related to the number of usage requests received (and the time needed to satisfy such requests, and so deallocate such threads' resources). The maximum number of threads that can be supported will typically depend, at least in part, on the processing capabilities of the one or more computing devices used to implement message processing service module, as well as on the number of requests received and their life spans, among other considerations. For example, additional threads may be instantiated in order to maintain a predefined level of throughput (e.g., a minimum number of usage requests to be processed by message processing service module 202 in a given time period).

Monitoring module 222 manages, as part of managing the creation of chronicler objects and aggregation of the information from chronicler objects received, the routing of chronicler objects from one (or more) chronicler generation modules thereof (comparable, e.g., to chronicler generation module 225) to chronicler insertion module 240. Chronicler insertion module 240 can effect insertion of a chronicler object in a number of ways, including by inserting the chronicler object into the request message, by providing the chronicler object to a corresponding thread in thread pool 221, or by another appropriate mechanism.

Monitoring module 222 also manages the routing of returning chronicler objects (or, alternatively, the information therein), received as part of a processing results messages, to an appropriate chronicler accumulation module (e.g., chronicler accumulation module 230) via chronicler extraction module 245. Chronicler extraction module 245 can obtain chronicler objects (or the information contained therein) using methods comparable to those used to insert chronicler objects in outgoing request messages noted above. Once the chronicler object(s) have been (or the requisite information) extracted, chronicler accumulation module 230 handles accumulating the information by causing accumulator object generator 232 to generate one or more accumulator objects (if needed). As time passes, accumulator objects are periodically passed to FIFO circular buffers 234.

In operation, message processing service module 202 receives a request message 250, and assigns the request for processing by a thread in thread pool 221. At this juncture, chronicler generation module 225 receives notification of the receipt of a usage request via usage request detection module 224, and invokes chronicler object generator 226 to generate a chronicler object. It will be appreciated in light of the present disclosure that usage request detection module 224 can be configured to detect when a usage request message such as request message 250 is received at message processing service module 202 in any appropriate and convenient manner. Alternatively, in one embodiment, functions within mediation system 110 (or even gateway 109) can be configured to notify message processing service module 202, which can, in turn, notify usage request detection module 224 when an incoming (or outgoing) usage request message is conveyed. Chronicler object generator 226 thus generates a corresponding chronicler object, in response to detection of request message 250. Chronicler generation module 225 is discussed below in connection with FIG. 3A.

Having generated the requisite chronicler object, monitoring module routes the chronicler object to chronicler insertion module 240, which causes the chronicler object to be inserted in (or otherwise associated with) the processing request message sent by the thread responsible for the request's processing. The thread sends the request (depicted in FIG. 2 as a processing request message 255) to the processing system in question (e.g., charging engine 115), which can be implemented using architectures such as those depicted in FIGS. 1B and 1C.

As the processing system processes processing request message 255, interception points are encountered, and as this occurs, interception point information is stored in the chronicler object in question. At some point in the processing of processing request message 255, a response thereto is generated within the processing system. At this juncture, the chronicler object is transferred to the corresponding response message (or, alternatively, the information carried by the chronicler object is transferred to a corresponding chronicler object in the response message). The response message is subject to whatever processing remains in this regard (encountering whatever interception points remain), and appears (with its chronicler object) at message processing service module 202, as a processing results message 260.

The thread responsible for its processing (typically the thread originally responsible for processing the original usage request (request message 250)) receives processing results message 260 and, as part of the processing of processing results message 260, provides chronicler object to chronicler extraction module 245. Chronicler extraction module 245 extracts the interception point information from the chronicler object (which, in some embodiments includes extracting the chronicler object from processing results message 260), and provides this information (or the chronicler object) to chronicler accumulation module 230, and more particularly, to accumulator object generator 232 for inclusion in the appropriate accumulator object. As noted earlier, with the passing of time, accumulator objects are periodically passed to FIFO circular buffers 234. At regular intervals, analysis client module 206 can access FIFO circular buffers 234 and store the accumulated interception point information for further processing, analysis, and/or storage. For analysis of a more "real time" nature, analysis client module 206 can access the accumulator objects directly. While it will be discussed in greater detail subsequently, it will be appreciated that an architecture such as that depicted in FIG. 2 advantageously decouples the computational operations of its various functions. For example, the processing performed by the threads of thread pool 221 are not affected by the accumulation operations performed by the components of chronicler accumulation module 230. Another example is the ability of the components of analysis client module 206 to access information in FIFO circular buffers 234 without any effect on the accumulation operations performed by the accumulator objects. These and other such advantages are discussed subsequently.

As part of analysis client module 206, latency reporter 215 is configured to determine latency of service transactions and provide a latency report describing the latency of the charging engine. An administrator further utilizes the user interface of latency monitoring and reporting settings editor 210 to define the settings of a latency reporting service implemented by message processing service module 202 (and more particularly, monitoring module 222), which includes specifying the length of a reporting window, whether any accumulator objects will be stored in statistics and reporting repository 216 for long term storage (and thus available for future latency analysis) via FIFO circular buffers 234, whether any statistics or reports that are generated by latency reporter 215 will be stored in statistics and reporting repository 216 for long term storage (and thus available for future administrator access), and when latency reports should be generated. The user interface of latency monitoring and reporting settings editor 210 is presented to the administrator as a single unified user interface, allowing the user to configure latency monitoring settings and latency reporting settings at a single control interface. Various settings of the latency reporting service can be stored as latency reporting profiles in latency monitoring and reporting settings repository 212, which can be tailored to meet the administrator's latency reporting needs.

Latency reporter 215, as noted, includes statistics generator 217 and report generator 218. Statistics generator 217 is configured to analyze interception point information accumulated in the given accumulator objects, such as by determining various latency measurements indicated by the information gathered by the chronicler objects (e.g., interception point labels and timestamps), various latency statistics, throughput, and the like. Report generator 218 is configured to generate one or more latency reports, based on information contained in accumulator objects that are received from FIFO circular buffers 234 during the reporting window. Latency reports illustrate latency of the charging engine over time, in such visual forms as line graphs, bar graphs, pie charts, and the like. A reporting window provides a window or fixed length of time over which latency is aggregated and maintained in the circular buffers (e.g., an accumulator object may accumulate interception point information over a span of 1 second, and if 20 accumulator objects are aggregated, the resulting reporting window is 20 seconds). Thus, a reporting window is measured from a first time (or start time) to a length of time defined by the number of accumulator objects in the reporting window multiplied by the time represented by each (or end time). A reporting window is thus on the order of seconds, but given that an analysis client module such as analysis client module 206 is capable of gathering and storing such information, no pressing need exists to significantly increase the storage of interception point information (or its accumulation) in a message processing service module such as message processing service module 202. Thus, FIFO circular buffers 234 are configured to store accumulator objects that are received at the FIFO circular buffers during the reporting window. In practical implementations, however, some number of slots for accumulator objects transferred into FIFO circular buffers 234 (e.g., 3 such slots) are available to accumulator object generator 232 for transfer of accumulator objects thereto, in order to prevent (or at least, avoid with acceptable certainty) contentions between accesses by accumulator object generator 232 and those by components of analysis client module 206.

In one embodiment, once an accumulator object has been received and stored in FIFO circular buffers 234, the accumulator object ages out of the reporting window and is discarded. For example, for a reporting window of 20 seconds, an accumulator object that was received 20 seconds in the past (e.g., was received at a FIFO circular buffer and has been stored in the FIFO circular buffer for 20 seconds) will be discarded once the reporting window rolls over to the next second (e.g., the accumulator object ages to 21 seconds and is discarded, disregarding any extra slots employed to avoid contention, for example). Such discarding typically occurs automatically as accumulator objects are stored in the FIFO circular buffer, where new accumulator objects overwrite the most-recently aged-out accumulator object. The age of an accumulator object can be determined or identified by a time identifier (ID) of the accumulator object that is set when the accumulator object is generated (or, alternatively, when the accumulator object is transferred into the FIFO circular buffer). In another embodiment, an administrator indicates in the latency reporting settings that accumulator objects should be stored in statistics and reporting repository 216 for long term storage. However, since a large number of accumulator objects are generated and age out as the reporting window moves, long term storage of accumulator objects will typically need to occur on a regular basis. For example, accumulator objects may be stored in long term storage, in case an administrator wishes to perform latency analysis of the accumulated latency information. However, it may be more beneficial for an administrator to schedule and store periodic and/or running latency reports that can more easily be stored for long term storage and be available for review.

Report generator 218 is also configured to display the one or more latency reports to an administrator in a viewing window or viewer. Report generator 218 is able to provide an administrator with analysis modes that include near-real-time latency analysis of the charging engine by displaying a running latency report that illustrates latency determined from accumulator objects received during the analysis. Latency reporter 215 is configured to store statistics, reports, and/or accumulator objects in statistics and reporting repository 216, which can be a database or other organized collection of data located on a storage device. Latency reporter 215 is further discussed below in connection with FIG. 10.

Figure 3A:
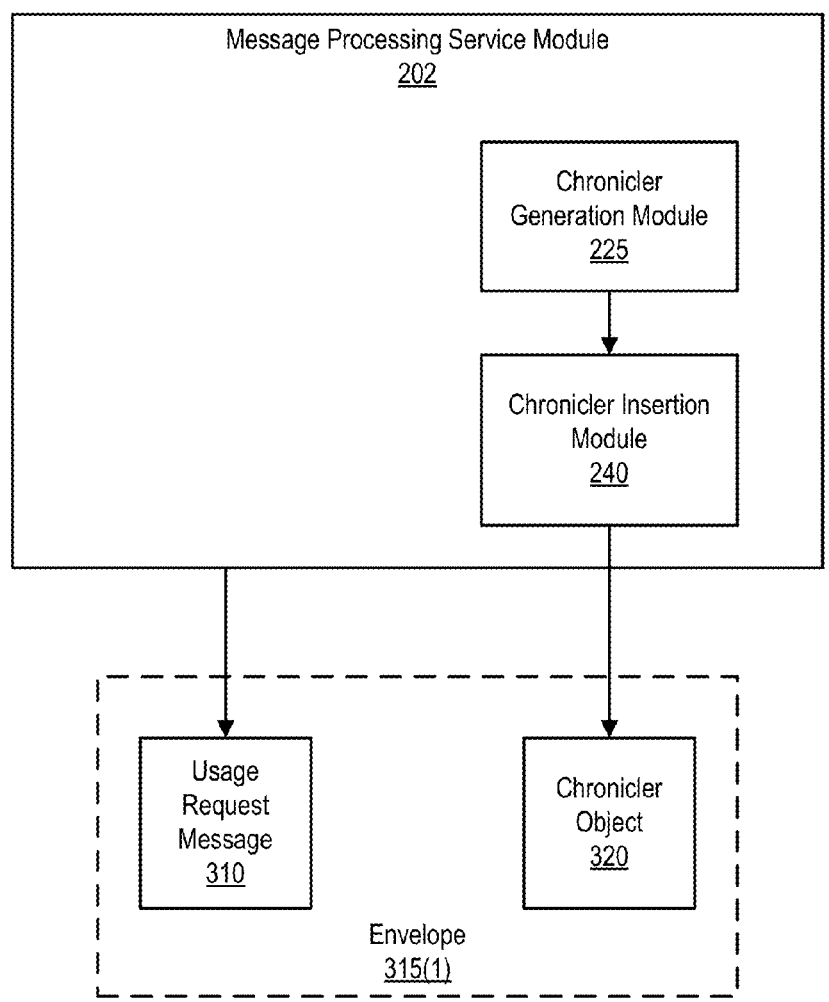
FIGS. 3A and 3B are simplified block diagrams illustrating example relationships between chronicler objects and associated messages, according to one embodiment.

FIG. 3A is a simplified block diagram illustrating an example relationship between a chronicler object and an associated usage request message. Message processing service module 202 receives a usage request, and in response, generates a usage request message 310 on behalf of a subscriber making the usage request. Message processing service module 202 then causes usage request message 310 to be inserted into an envelope 315(1).

Also in response to receipt of the usage request, message processing service module 202 (e.g., via usage request detection module 245) causes chronicler generation module 225 to generate a chronicler object 320. Chronicler generation module 225 provides chronicler object 320 to chronicler insertion module 240, which, in certain embodiments, then associates chronicler object 320 with the corresponding usage request message 310 by, for example, inserting chronicler object 320 into envelope 315(1). In another embodiment, chronicler insertion module 240 is configured to generate an envelope 315(1) (which is a packaging mechanism) and insert usage request message 310 and chronicler object 320 into envelope 315(1). In one embodiment, message processing service module 202 is configured to insert usage request message 310 into envelope 315(1), upon instruction from chronicler insertion module 240. In one embodiment, chronicler insertion module 240 is also configured to insert chronicler object 320 into envelope 315(1) (which in one embodiment includes transmitting envelope 315(1) that includes usage request message 310 and chronicler object 320) and facilitate the sending of envelope 315(1) to the charging engine (such as charging engine 115 and/or external billing/charging engine 125). Alternatively, such insertion operations can be performed by one or more of the threads in a thread pool such as 221.

In one embodiment, chronicler insertion module 240 is configured to receive chronicler objects from one or more instances of chronicler generation module 225 (e.g., from multiple threads) and associate each chronicler object with its corresponding usage request message, either in a single envelope, multiple envelopes, or a combination thereof. In one embodiment, chronicler insertion module 240 is configured to receive chronicler objects from thread manager 220. In one embodiment, an instance of a chronicler generator is associated with a particular message builder instance of message processing service module 202. In such an embodiment, a message builder instance is configured to generate a particular type of usage request message for a subscriber, and the associated chronicler generator instance is dedicated to generating a chronicler object for each usage request message generated by that particular message builder instance. Chronicler insertion module 240 can also include a queue or buffer for temporarily holding incoming chronicler objects and/or usage request messages before they are transmitted to the charging engine.

Figure 3B:
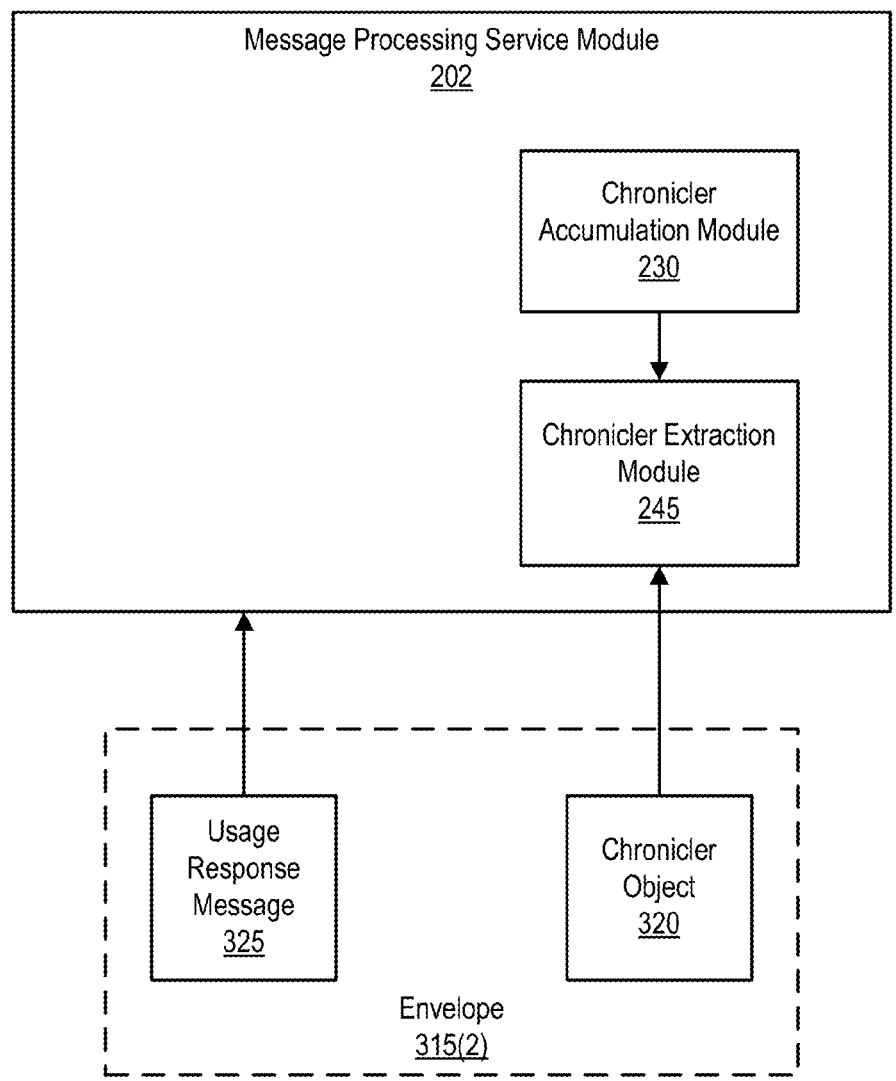

FIG. 3B is a simplified block diagram illustrating an example relationship between a chronicler object and an associated usage response message. After the charging engine has received envelope 315(1), containing usage request message 310 and chronicler object 320, charging engine performs appropriate charging operations and chronicler object 320 is updated with interception point information (as described in further detail below in connection with FIGS. 5A and 5B) as usage request message 310 (in envelope 315(1)) passes through the process flow therein. The charging engine generates a corresponding usage response message 325, in response to usage request message 310, that is returned to mediation system 110. As noted earlier, when envelope 315(1) reaches this point in the processing system (e.g., charging engine 115), and usage response message 325 is generated, chronicler object 320 (or at least, the interception point information maintained therein) is transferred to a new envelope, envelope 315(2) (the former being depicted in FIG. 3B). Thus, chronicler object 320 (which was received and associated with usage request message 310) is associated with usage response message 325. In one embodiment, the processes in the processing system (e.g., charging engine 115) generate envelope 315(2) and insert usage response message 325 and chronicler object 320 therein. Alternatively, if chronicler handlers are employed, one such chronicler handler can be configured to generate envelope 315(2) and insert usage response message 325 and chronicler object 320 into envelope 315(2). Such a chronicler handler can also be configured to transmit envelope 315(2) (and so, response message 325 and chronicler object 320) onward to mediation system 110 (and more specifically, message processing service module 202).

Chronicler extraction module 245 is configured to receive envelope 315(2) (and so usage response message 325 and chronicler object 320). In one embodiment, chronicler extraction module 245 is configured to extract usage response message 325 from envelope 315(2) and route message 325 to message processing service module 202. Chronicler extraction module 245 is also configured to extract chronicler object 320 from envelope 315(2) and provide chronicler object 320 to chronicler accumulation module 230. Chronicler extraction module 245 can also include a queue or buffer for temporarily holding incoming chronicler objects and/or usage response messages before they are routed to a chronicler accumulator and/or to message processing service module.

In one embodiment, chronicler extraction module 245 is configured to route or provide chronicler objects to one or more instances of chronicler accumulation module 230 (e.g., on multiple threads). In one embodiment, chronicler extraction module 245 is configured to route or provide chronicler objects to a thread manager that in turn routes the chronicler objects to chronicler accumulator instances (e.g., associated with threads in a thread pool such as thread pool 221). In one embodiment, an instance of a chronicler accumulator is associated with a particular message builder instance of message processing service module 202. In such an embodiment, the usage response message is returned to the particular message builder instance (which built the corresponding usage request message), and the associated chronicler accumulator instance is dedicated to accumulating chronicler objects associated with usage response messages directed to the particular message builder instance. In this manner, chronicler objects of a particular type message builder (which is responsible for generating a particular type of usage request message and for processing the corresponding usage response message) can be gathered and analyzed to determine the latency time of a particular type of service transaction (or the latency time that is measured from when the usage request message is transmitted from the chronicler transmitter to when the corresponding usage response message is received at the chronicler receiver).

Figure 4A:
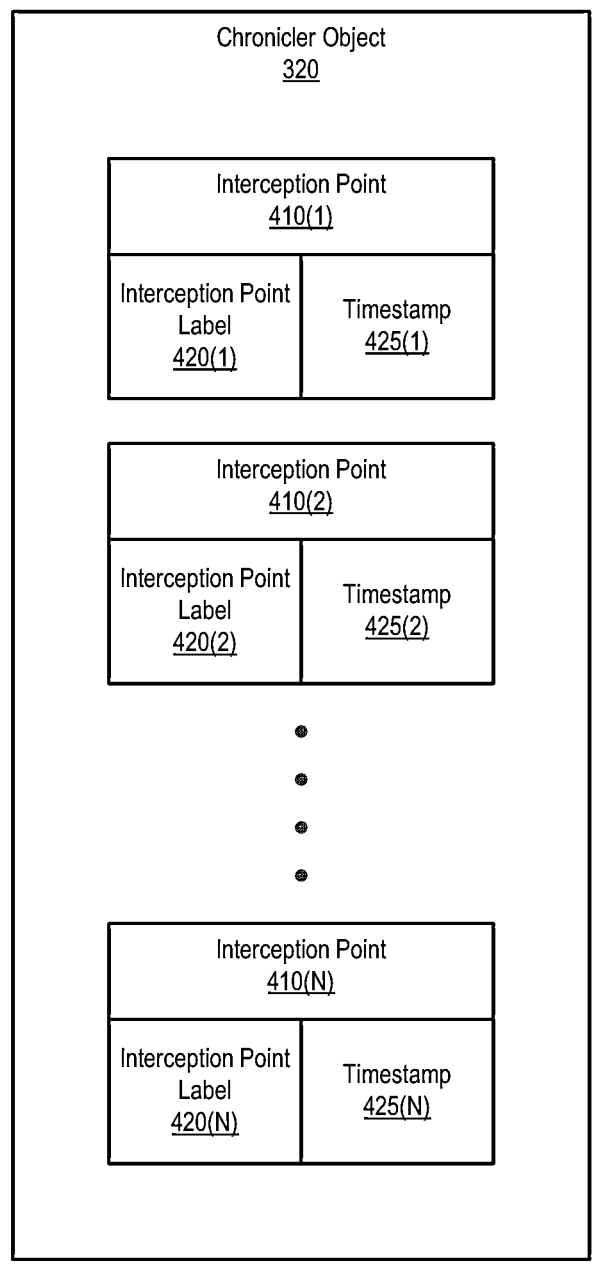
FIG. 4A is a simplified block diagram illustrating components of an example chronicler object, according to one embodiment.

FIG. 4A is a simplified block diagram illustrating components of an example chronicler object 320. As described in connection with FIG. 3A, chronicler object 320 accompanies usage request message 310 to the charging engine for processing. As has also been noted, a processing system such as charging engine 115 typically includes a number of charging components that are configured to cooperatively perform one or more charging operations using, among other such sources, the information in usage request message 310, where each charging component is responsible for performing one or more portions of the charging operations (also referred to as sub-processes), examples of which have been discussed in connection with FIGS. 1B and 1C. In order to track the latency of usage request message 310, chronicler object 320 is updated with interception point information at various interception points along the process flow. A system can be configured with one or more "time spreads," each of which represents a combination of two interception points. While any two points-in-time (e.g., as represented by timestamps) can be combined into a time spread, practically, only those that are meaningful (e.g., that define boundaries of a processing system component) are typically specified.

In one embodiment, one or more time points (depicted in FIG. 4A as interception points 410(1)-(N)) are inserted in chronicler object 320, as the envelope containing the given message (request or response) and chronicler object 320 pass through the various interception points represented thereby. Thus, each interception point sub-structure of chronicler object 320 includes interception point information such as a interception point label (depicted in FIG. 4A as interception point labels 420(1)-(N)) and a timestamp (depicted in FIG. 4A as timestamps 425(1)-(N)), corresponding to a time at which chronicler object 320 encountered the interception point identified by the interception point label. As noted elsewhere herein, interception point information can include this or other information, and can, for example, use predefined interception points, thereby requiring only the requisite timestamps to allow for the determination of the latencies of interest. As noted, a timestamp is an indication of the point in time (the time of day, date, and/or other measure) at which the chronicler object is stamped at a particular interception point. interception point labels 420 identify the particular interception point at which corresponding timestamps 420 are collected. Time points 410 are further discussed below in connection with FIG. 6A-6B. This and other information, among other such parameters, can be defined by the administrator in the latency monitoring settings, as discussed above.

Figure 4B:
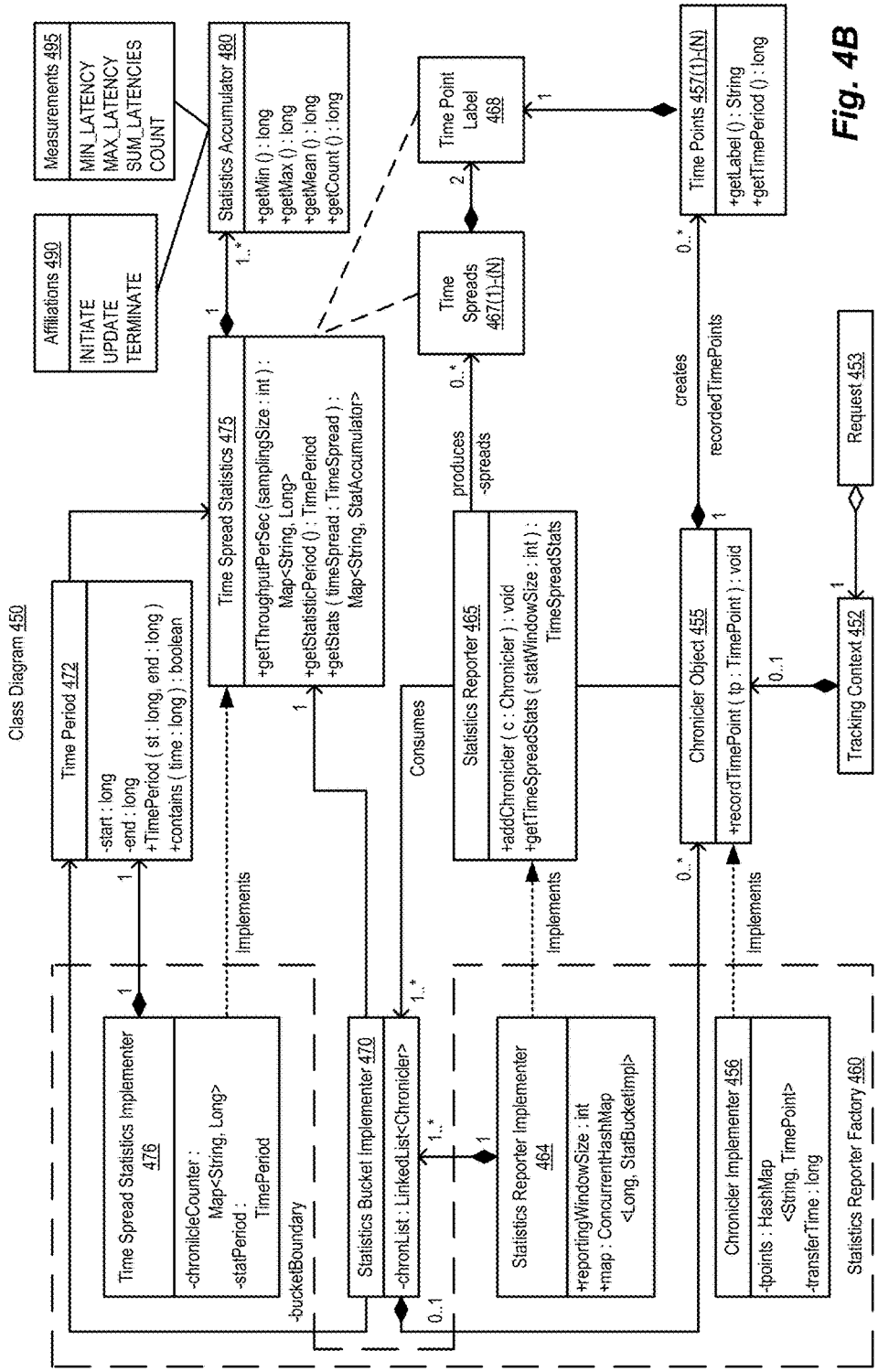
FIG. 4B is s simplified block diagram illustrating elements of an example class diagram, according to one embodiment.

FIG. 4B is a simplified block diagram illustrating an example class diagram, according to one embodiment. More specifically, the class diagram of FIG. 4B is an example of a statistics reporter class diagram, and is depicted in FIG. 4B as a class diagram 450. Class diagram 450 illustrated an example of the elements that can be used in tracking timestamps, and so, measuring the overall performance for a charging system such as that described earlier, and/or the desired portions thereof. To that end, class diagram 450 defines a tracking context 452 created in response to the receipt of a request 453. Associated with tracking context 452 are one or more chronicler objects (exemplified in FIG. 4B by a chronicler object 455). As noted earlier, a tracking context such as tracking context 452 can, for example, be used to provide functionality that facilitates the recordation of interception point information in a chronicler object associated therewith. Such might be the case, for example, where a tracking context (or a proxy therefor, such as a separate object) and a chronicler object are inserted in (or otherwise associated with) a message construct such as an envelope (described subsequently). In such a case, the tracking context (or its proxy in the envelope) detects encounters with one or more interception points, and records the requisite information in the chronicler object. Information regarding the interception points of interest can also be carried in the envelope or the tracking context, for example. It will also be appreciated that, in certain embodiments, the chronicler object itself might be configured to detect such interception points and update itself accordingly.

Chronicler object 455 is implemented by a chronicler implementer 456, and represents a chronicler object such as chronicler object 320 of FIG. 4A. In this regard, and as illustrated with regard to chronicler object 320, chronicler object 455 has recorded therein one or more (actually zero or more) recorded time points (depicted in FIG. 4B as time points 457(1)-(N). As is also depicted in FIG. 4B, chronicler object 455 is created by a statistics reporter factory 460. Statistics reporter factory 460 (via statistics reporter 464) also creates a statistics reporter 465. Statistics reporter 465, in turn, is used to determine time spreads (depicted in FIG. 4B as time spreads 467(1)-(N)), each of which can then be identified using a interception point label such as a time point label 468 of FIG. 4B. In turn, a statistics bucket implementer 470 uses information from chronicler object 455 and statistics reporter 465 (based on a time period 472) to determine time spread statistics (depicted in Fib. 4B as time spread statistics 475, as implemented therein by a time spread statistics implementer 476), which are, in turn, used by one or more statistics accumulators 480. Statistics bucket implementer 470 (a singleton, or a design pattern that restricts the instantiation of a class to one object) is composed of chronicler objects that were added to statistics reporter 465 by various Billing and Revenue System (BRS) worker threads in the thread pool. In the manner noted previously, chronicler objects are added to the head of a linked list (e.g., FIFO circular buffers 234), and trimmed from the tail of the linked list, if their transfer time falls outside the reporting window. In one embodiment, each BRS worker thread has its own "statistics bucket" (statistics bucket implementer 470). The statistics are then combined when getTimeSpreadStat( ) is called on statistics reporter 465. Statistics accumulators 480 thus use information regarding affiliations, as well as information from time spread statistics 475 to allow for measurement of various parameters. Such affiliations and measurements are depicted in FIG. 4B as affiliations 490 and measurements 495, respectively. Examples of the use of such structures are provided subsequently in connection with FIGS. 8A, 8B, 8C, and 8D.

Figure 5A:
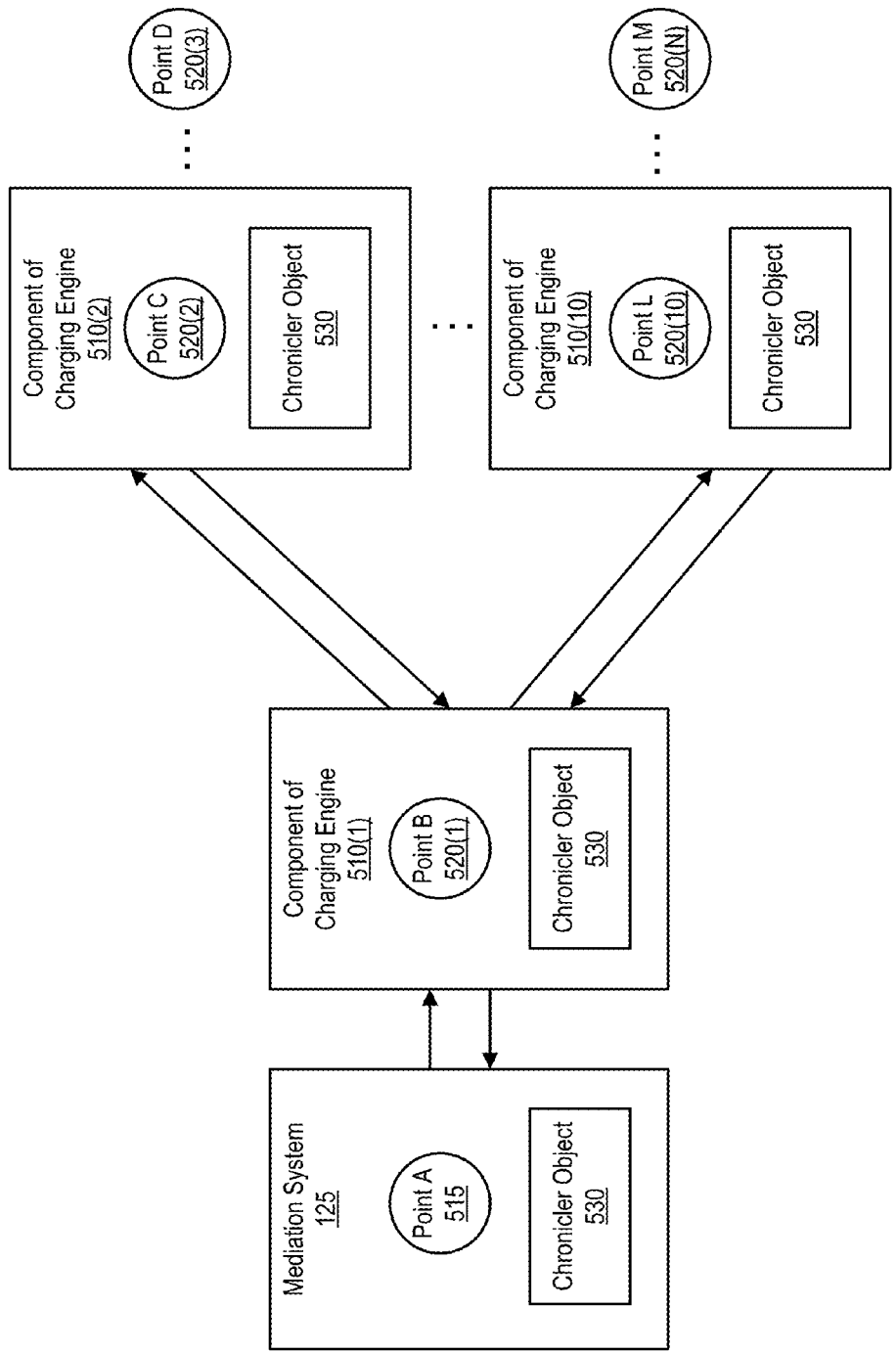
FIGS. 5A and 5B are simplified block diagrams illustrating example transmission paths of chronicler objects through components of a charging engine, according to one embodiment.

FIG. 5A is a simplified block diagram illustrating an example transmission path of a chronicler object 530 through components of a charging engine. A usage request message (not shown) and associated chronicler object are received by one or more of the various charging components 510(1)-(N). Chronicler object 530 is intercepted at zero or more interception points 520(1)-(N), where the interception points are defined, for example, in the latency monitoring settings defined by the administrator. In the embodiment illustrated, an administrator has defined the latency monitoring settings to cause the chronicler object to be intercepted at a single interception point at each charging component, though it will be appreciated in light of the present disclosure that such an illustration is merely an example. For example, an administrator can configure the chronicler object to be intercepted at a receiving interception point (e.g., intercept the chronicler object upon receipt at the charging component before a process or sub-process of the charging operation is performed) or at a transmitting interception point (e.g., intercept the chronicler object after the process or sub-process of the charging operation is performed and the chronicler object is about to be transmitted to another charging component or to the mediation system).

Although only one interception point is illustrated at each charging component, more than one interception point can be defined at and/or within each charging component. In one embodiment, receiving and transmitting interception points can be defined at a charging component for each process or sub-process that the charging component is responsible for performing.

Once the chronicler object is intercepted, interception point information for the interception point is inserted into the chronicler object. In the embodiment illustrated, an administrator has defined the latency monitoring settings to provide that the chronicler object should receive a time point that includes a timestamp of the present time and an interception point label that identifies the interception point at which the timestamp was collected. In another embodiment, an administrator defines the latency monitoring settings to provide that the chronicler object should receive only a timestamp for the interception point (where the interception point is not needed because such points are predefined). Time points are further discussed below in connection with FIG. 6A-6B.

FIG. 6A is a simplified block diagram illustrating example time points collected by chronicler object 530 as it travels through components of a charging engine following the transmission path illustrated in FIG. 5A. Chronicler insertion module 240 can be (and in the present example, is) configured to insert a first time point 610(1) in chronicler object 530 at (transmission) point A 515 before leaving mediation system 110. Time point 610(1) includes a timestamp 620(1) and an associated interception point label 630(1) that identifies point A 515. Time point 610(1) indicates when chronicler object 530 leaves point A (as indicated by the "Tx" tag in the interception point label, although other ways of identifying the transmission point may be used) and is transmitted to the charging engine, which performs one or more charging operations using the associated usage request message. A charging operation is often cooperatively performed on the usage request message by various charging components of the charging engine, where each charging component is responsible for performing one or more processes or sub-processes of the charging operation. AS described earlier, the chronicler object accompanies the usage request message to each charging component and receives a time point that reflects when the chronicler object (and the usage request message) was received at the charging component.

In the example illustrated, chronicler object 530 is received at charging component 510(1), where latency monitoring settings indicate that the chronicler object should be intercepted at interception point B 520(1). Interception point B can be a receiving interception point (e.g., upon receipt at a charging component before a charging process or sub-process is performed) or a transmitting interception point (e.g., after the charging process or sub-process is complete). Time point 610(2) is inserted into chronicler object 530, where time point 610(2) includes a timestamp 620(2) and an associated interception point label 630(2) that identifies point B. In the example illustrated, the latency monitoring settings indicate that chronicler objects should be intercepted at receiving interception points. Accordingly, the interception point label for each time point identifies a receiving interception point, as indicated by the "Rx" tag in the interception point label (although other ways of identifying the interception point may be used). Since such latency monitoring settings do not indicate that the chronicler object should be intercepted at a transmitting interception point at the charging component (e.g., the transmitting interception point is turned off), intercept chronicler object 530 is not intercepted again at the charging component. In the alternative, interception point labels can reflect functional responsibilities of each process and/or sub-process, as will be described in connection with FIGS. 8A, 8B, 8C, and 8D.

In this manner, chronicler object 530 travels with its associated usage request message to the various charging components that are configured to process the usage request message. As it travels, chronicler object 530 collects time points 610(1)-(N) as chronicler object 530 is intercepted at each interception point. In the embodiment shown, chronicler object 530 travels from charging component 510(1) to charging component 510(2) and returns to charging component 510(1). At each interception point of the charging components 510, a time point is inserted into chronicler object 530. Since each charging component is responsible for one or more processes or sub-processes of a charging operation and may receive the usage request message at different times during the charging operation, chronicler object 530 may receive more than one time point at any given charging component. For example, chronicler object 530 includes a first time point 610(2) when chronicler object 530 is initially received at interception point B at charging component 510(1) from the mediation system. Chronicler object 530 includes a second time point 610(12) when chronicler object 530 is received again at interception point B at charging component 510(1) from charging component 510(2).

In the example depicted in FIG. 6A, upon the return of chronicle object 530 at chronicler extraction module 245 (at mediation system 110), chronicler extraction module 245 is configured to insert a final time point 610(N) at (receiving) point A 515. Time point 610(N) includes a timestamp and an interception point label that identifies point A 515. Time point 610(N) indicates when chronicler object 530 is received at point A (as indicated by the "Rx" tag in the interception point label, although other ways of identifying the receiving point may be used). Chronicler object 530 is routed to chronicler processing service module 135, which performs analysis of the time points to determine latency of the charging engine. For example, an overall latency of the service transaction can be determined by taking the difference between the timestamp of time point 610(1) and the timestamp of time point 610(N).

Figure 5B:
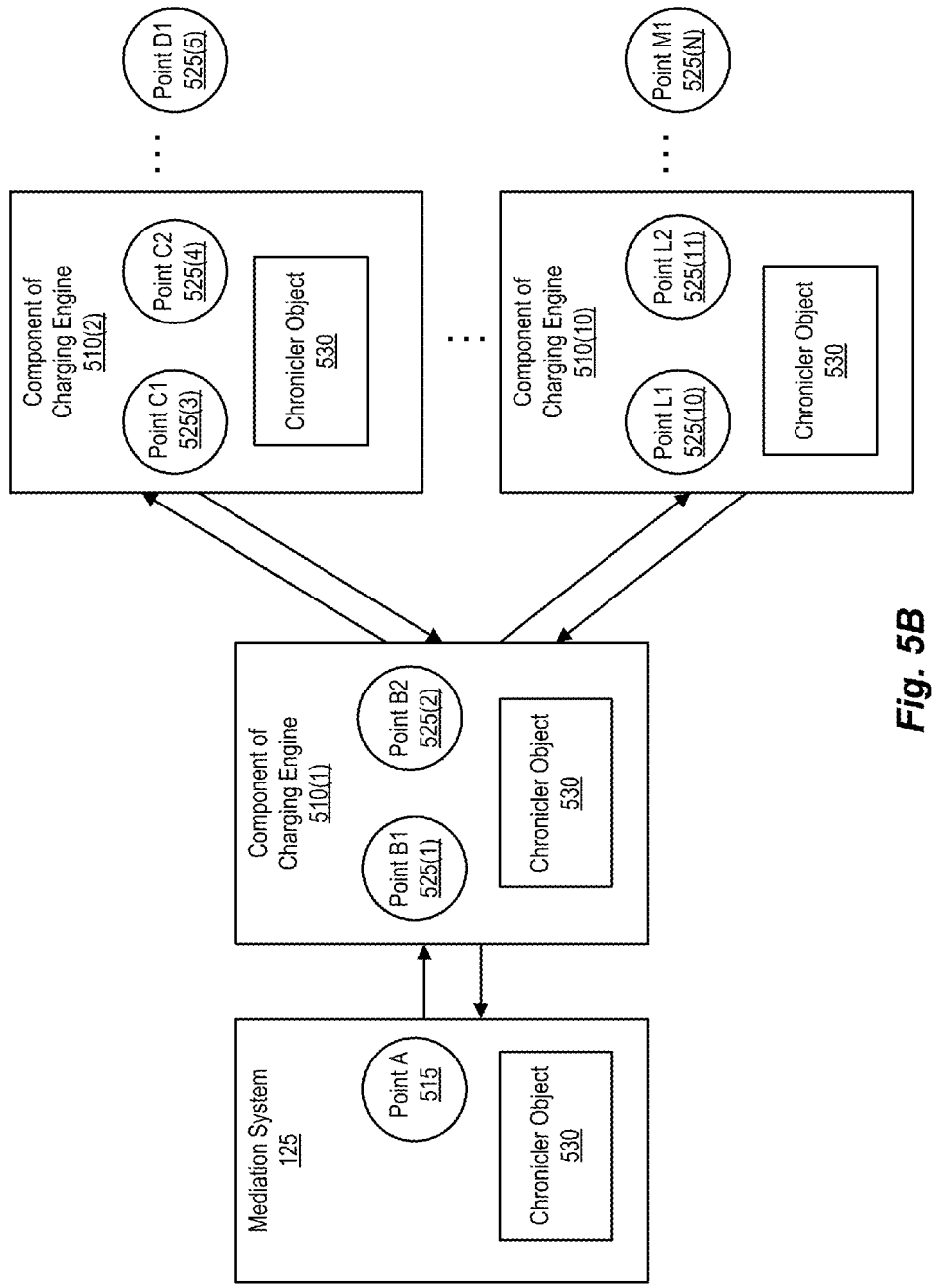

FIG. 5B is a simplified block diagram illustrating another example transmission path of (process flow followed by) a chronicler object 530 through components of a charging engine. In the embodiment illustrated, an administrator has defined the latency monitoring settings to provide that the chronicler object should be intercepted at two interception points at each charging component. Interception points are illustrated as points 525(1)-(N). In such an example, the latency monitoring settings provide that the chronicler object is intercepted at a receiving interception point (e.g., upon receipt at a charging component) and at a transmitting interception point (e.g., after a process or sub-process performed by the charging component is complete). Again, it will be appreciated in light of the present disclosure that interception points can be placed anywhere in the process flow, and so the example depicted in FIG. 5B is merely an example of the many possibilities. Each charging component 510 has a receiving interception point (which is identified as a first point, such as point B1, point C1, and so on) and a transmitting interception point (which is identified as a second point, such as point B2, point C2, and so on). In the embodiment shown, a time point is inserted at each receiving and transmitting interception point, where the time point includes a timestamp of the present time and an interception point label that identifies the interception point at which the timestamp was collected. Although only two interception points are illustrated at each charging component, more than two interception points can be defined at each charging component. In one embodiment, receiving and transmitting interception points can be defined at a charging component for each process or sub-process that the charging component is responsible for performing.

FIG. 6B is a simplified block diagram illustrating example time points collected by chronicler object 530 as it travels through components of a charging engine following the transmission path illustrated in FIG. 5B. Chronicler insertion module 240 is configured to insert a first time point 610(1) at (transmission) point A 515 before leaving mediation system 110. Time point 610(1) includes a timestamp 620 and an associated interception point label 630 that identifies point A 515 (as indicated by the "Tx" tag in the interception point label, although other ways of identifying the transmission point may be used) and is transmitted to the charging engine.

Chronicler object 530 is received at charging component 510(1), where latency monitoring settings indicate that the chronicler object should be intercepted at interception points B1 525(1) and B2 525(2). Time point 610(2) is inserted into chronicler object 530 at point B1 upon receipt at charging component 510(1), where time point 610(2) includes a timestamp 620 and an associated interception point label 630 that identifies point B1. In one embodiment, because point B1 is identified as a receiving interception point, an "Rx" tag is not needed in the interception point label (although other ways of identifying the interception points may be used). Similarly, time point 610(3) inserted into chronicler object 530 at point B2 upon completion of the charging component's process or sub-process, where time point 610(3) includes a timestamp 620 and an associated interception point label 630 that identifies point B2. In one embodiment, since point B2 is identified as a transmitting interception point, a "Tx" tag is not needed in the interception point label (although other ways of identifying the interception points may be used, as noted).

Figure 7A:
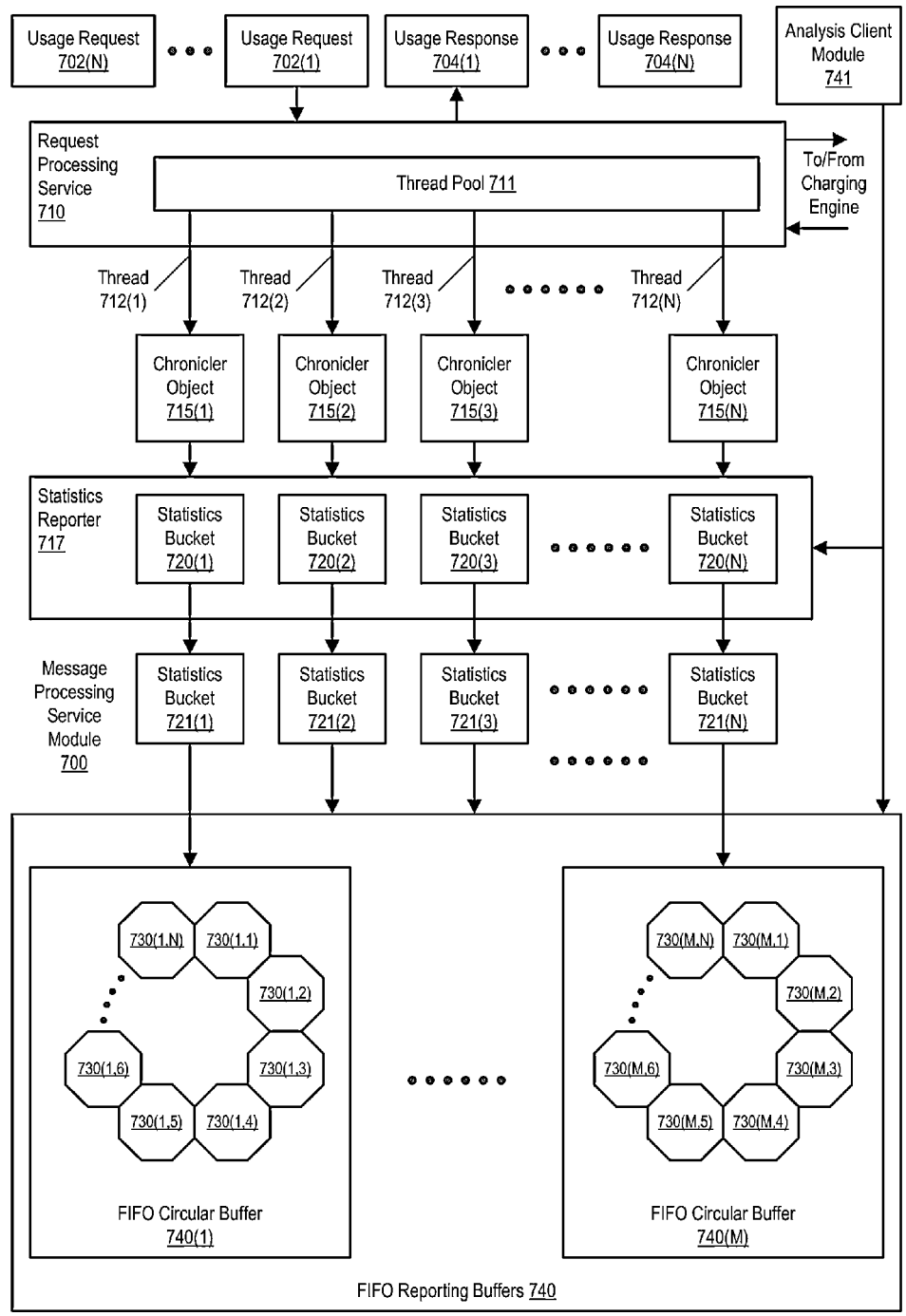
FIGS. 7A and 7B are simplified block diagrams illustrating an example accumulator object generation process, according to one embodiment.

FIG. 7A is a simplified block diagram illustrating an example process for the generation and processing of chronicler and accumulator objects. FIG. 7A thus depicts an example implementation of a message processing service module such as message processing service module 202 (depicted in FIG. 7A as a message processing service module 700). As before, message processing service module 700 receives some number of usage requests (depicted in FIG. 7A as usage requests 702(1)-(N)), and responds with some number of usage responses (depicted in FIG. 7A as usage responses 704(1)-(N)). Usage requests 702(1)-(N) are received at a request processing service 710, which supports a thread pool 711 (comparable to, for example, thread pool 221 of FIG. 2). Thread pool 711 supports a number of threads of execution (depicted in FIG. 7A as threads 712(1)-(N)). As can be seen in FIG. 7A, the receipt and processing of usage requests 702(1)-(N) result in processing request messages (and associated chronicler objects) being sent to the charging engine, and, in response, processing response messages being received therefrom, by threads 712(1)-(N). Upon receipt of the processing response messages, threads 712(1)-(N) not only provide subscribers with usage responses 704(1)-(N), but also provide the chronicler objects thus received (depicted in FIG. 7A as chronicler objects 715(1)-(N)) to a statistics reporter 717, and more specifically, to a set of statistics buckets 720(1)-(N). While statistics buckets 720(1)-(N) are accepting further accumulations, interception point information from the chronicler objects received (e.g., from chronicler objects 715(1)-(N) on threads 712(1)-(N)) accumulate in statistics buckets 720(1)-(N). At some point in time (e.g., after 1 second of such accumulation operations), statistics buckets 720(1)-(N) are transferred (as statistics buckets 721(1)-(N)) into one of the slots (depicted in FIG. 7A as one of accumulator objects 730(1,1)-(M,N)) of a corresponding FIFO (depicted in FIG. 7A as FIFO circular buffers 740(1)-(M), or FIFO reporting buffers 740, in the aggregate). It is at this juncture that the accumulator objects stored in FIFO reporting buffers 740 are made available to an analysis module 741, which provides support for obtaining, processing, and analyzing information regarding latencies gathered by the chronicler objects generated, sent, received, and aggregated by message processing service module 700.

Statistics buckets 720(1)-(N) are one way of dividing up incoming chronicler objects for accumulator processing, although other ways to divide the chronicler objects among chronicler accumulators may be used. Each one of statistics bucket 720(1)-(N) is a temporary storage area that is associated with a single chronicler accumulator and is configured to accumulate interception point information from incoming chronicler objects for that particular chronicler accumulator. As a chronicler object is routed to the chronicler accumulator, the chronicler object's interception point information is accumulated in the corresponding chronicler accumulator's bucket. Each bucket is configured to collect and temporarily store interception point information from chronicler objects for a recurring period of time, also referred to as a collection period. A next collection period begins upon expiration of a present collection period. The length of time of an example collection period can be on the order of seconds (e.g., a collection period of one second, such granularity being pertinent in certain protocols and standards, for example) or a fraction thereof (e.g., on the order of milliseconds, such as a collection period of 50 milliseconds, also pertinent in certain protocols and standards). In this regard, while timing and timestamps are discussed in terms of seconds, time of day, and so on, for ease of understanding, it will be appreciated in light of the present disclosure that such timing can be (and often are, in fact) in terms of milliseconds or other temporal measure more meaningful with respect to the processing systems involved.

The chronicler accumulator is configured to generate an accumulator object for each collection period. As chronicler objects are collected in statistics buckets 720(1)-(N) during a present collection period, chronicler accumulator extracts the interception point information for each of the time points from each chronicler object, and accumulates this information in the accumulator object for that collection period for that thread. Once the present collection period of the statistics bucket has expired and the time points of all chronicler objects in the bucket have been accumulated, the statistics bucket is stored in the chronicler accumulator's FIFO circular buffer 740 and the accumulator object is cleared (e.g., all chronicler objects in the bucket are discarded). Since the collection period is recurring, the bucket begins collecting interception point information from incoming chronicler objects during a next collection period. In some embodiments, this can be accomplished by the chronicler accumulator generating a new accumulator object for the next collection period.

Each of FIFO circular buffers 740(1)-(M) is configured to temporarily store a number of accumulator objects. Once the FIFO circular buffer is full, FIFO circular buffers 740(1)-(M) are configured to begin overwriting the oldest data (or oldest accumulator object) stored therein. FIFO circular buffer continues to overwrite the oldest data (or oldest accumulator object) as new data (or new accumulator object) is added to the appropriate one of FIFO circular buffers 740(1)-(M). The set of accumulator objects that are stored in a FIFO circular buffer at any given time represent a moving reporting window, measured from the present time to a length of time immediately preceding the present time. Since each accumulator object is generated for a collection period, the length of time of the reporting window is (approximately) the collection period's length of time multiplied by the number of accumulator objects stored in the FIFO circular buffer. The chronicler accumulator can use the accumulated interception point information contained in the set of accumulator objects to determine the latency of service transactions that were completed during the reporting window (e.g., the chronicler object associated with the service transaction was received in the immediately preceding length of time of the reporting window). Latency reporting is further discussed below in connection with FIG. 10.

Figure 7B:
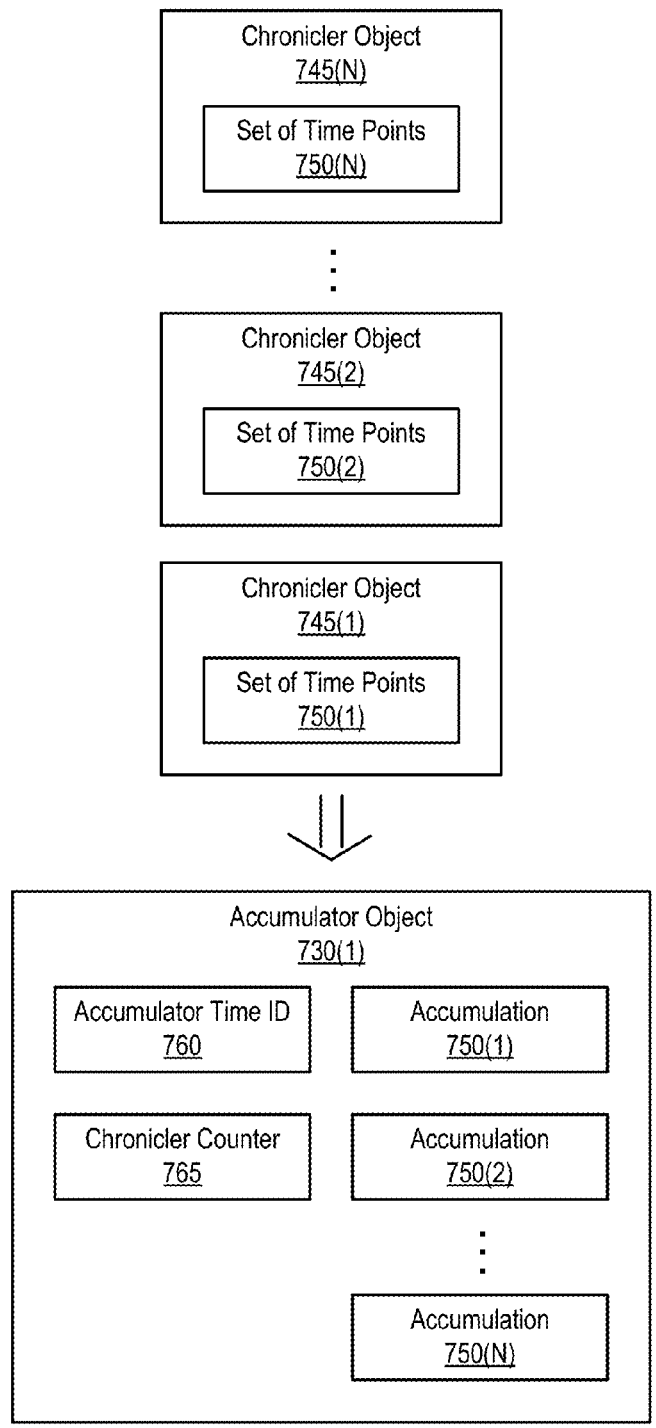

FIG. 7B is a simplified block diagram further illustrating an example of the processing performed when accumulating interception point information stored in chronicler objects, in accumulator objects. When a collection period begins, a chronicler accumulation module (also referred to herein as a chronicler accumulator) is configured to generate an accumulator object 730 for that collection period (e.g., 1 second of operation). A chronicler accumulator such as accumulator object 730 is also configured to store an accumulator time identifier (ID) 760 that indicates particular collection period with which accumulator object 760 is associated. Example accumulator time IDs include a timestamp of the time the accumulator object begins accumulating interception point information from chronicler objects, a numerical identifier of the collection period (e.g., a running sequence number that is incremented with each collection period), and the like. As a number of chronicler objects 745(1)-(N) are received in a statistics accumulator during a particular collection period, the processes supporting the accumulator process each chronicler object 745 by extracting interception point information (e.g., the set of time points 750) from each and accumulating the set of time points in accumulator object 730 as accumulations 750(1)-(N), with each time point of a given chronicler object with that time point of the other chronicler objects thus accumulated. As each chronicler object is processed, a chronicler counter 765 in accumulator object 730 is incremented, which indicates the number of chronicler objects whose time points have been accumulated in accumulator object 730. Chronicler counter 765 can thus be used to determine the throughput of the chronicler objects received during the particular collection period, which in turn reflects the throughput of the service transactions during the particular collection period, and can be used to calculate other metrics, such as the mean time for each latency of interest. Once the particular collection period has expired, accumulator object 730 is added to the appropriate one of FIFO circular buffers 740(1)-(M).

Figure 8A:
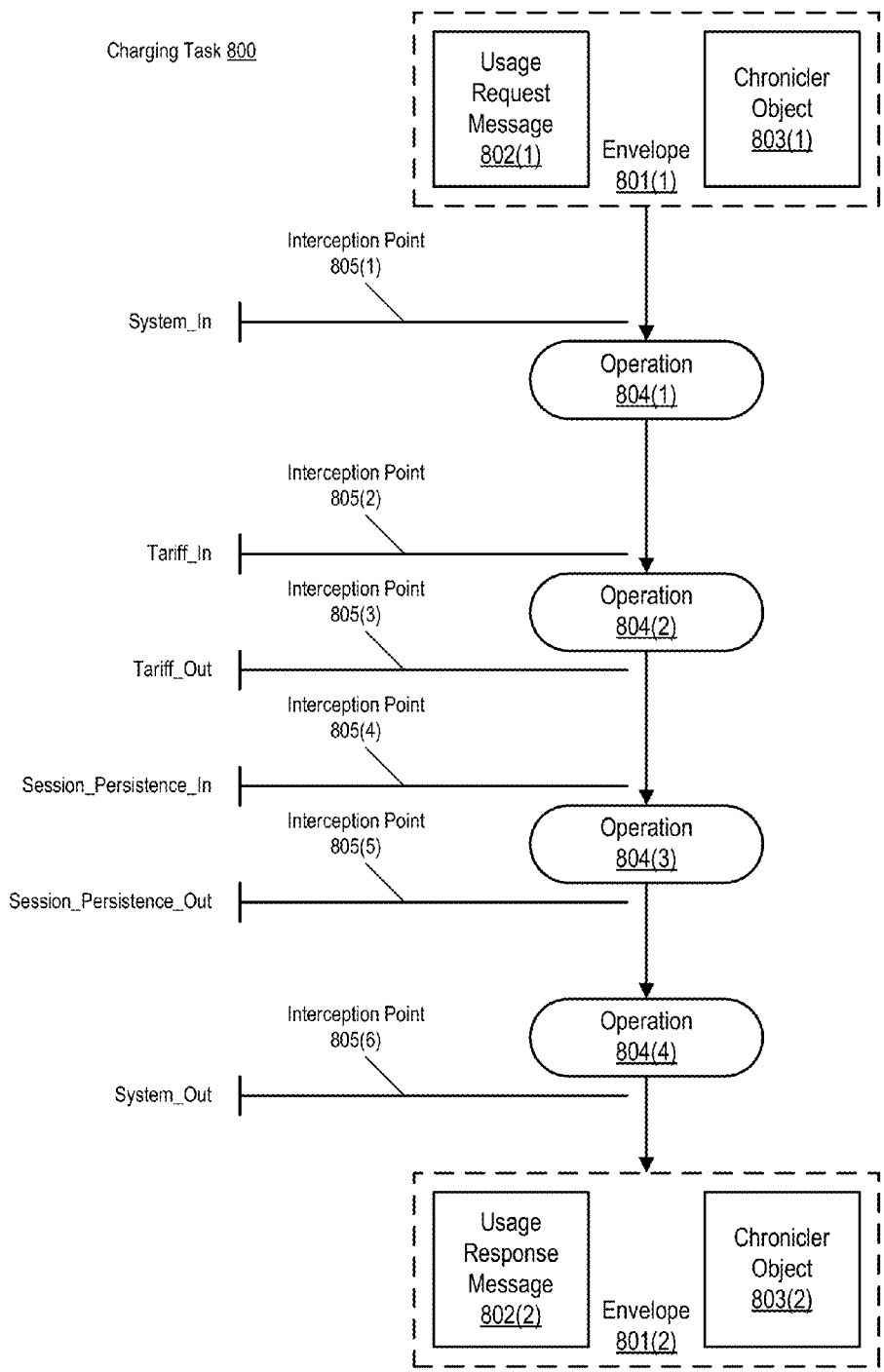
FIG. 8A is a flow diagram illustrating an example of the operations that may be carried out by a charging system, according to one embodiment.

FIG. 8A is a flow diagram illustrating an example of the operations that may be carried out by a charging system, according to one embodiment. Thus, FIG. 8A illustrates an example of certain of the operations performed in performing a charging task 800. Charging task 800 begins with the receipt of a request message (depicted as an envelope 801(1)) at the charging system, and ends with the charging system sending a response message (depicted as an envelope

801(2)), in response thereto. Envelope 801(1) includes a usage request message 802(1) and a chronicler object 803 (1), in the manner of comparable elements depicted in FIG. 3A. Similarly, envelope 801(2) includes a usage response message 802(2) and a chronicler object 803(2), in the manner of comparable elements depicted in FIG. 3B. As noted elsewhere herein, chronicler objects 803(1) and 803 (2) can, in fact, be the same object, simply transferred between envelopes 801(1) and 801(2) at some point in charging task 800. Alternatively, if parameter monitoring is implemented in the charging system accordingly, chronicler objects 803(1) and 803(2) can be distinct from one another (where the transfer might involve the transfer of the interception point information carried by chronicler object 803 (1) into chronicler object 803(2). As also noted elsewhere herein, such a transfer will typically occur at a point at which operations related to usage request message 802(1) have been performed, and a response appropriate thereto (e.g., envelope 801(2), containing usage response message 802 (2)) is generated. As shown in FIG. 8A, such is the case in charging task 800, which performs such a transfer at one of the operations thereof.

Charging task 800 also includes an operation 804(1), an operation 804(2), an operation 804(3), and an operation 804(4). Also illustrated in FIG. 8A are several interception points, which have been defined in advance, and are enabled. These interception points (depicted in FIG. 8A as interception points 805(1)-(6)) correspond to interception point labels System_In, Tariff_In, Tariff_Out, Session_Persistence_In, Session_Persistence_Out, and System_Out, respectively. Table 1 lists the relationship between these elements.

TABLE 1

Relationships between interception points and their labels.

| Time Spread Name | Start Time Point | End Time Point |
| --- | --- | --- |
| Overall_Process | System_In | System_Out |
| Apply_Tariff | Tariff_In | Tariff_Out |
| Session_Persistence | Session_Persistence_In | Session_Persistence_Out |

According to methods and systems such as those described herein, chronicler object 803(1) (or chronicler object 803(2), depending on the interception point in question) is updated with an appropriate one of these interception point labels and a corresponding timestamp at each of interception points 805(1)-(6). As noted earlier, depending on the needs of the parameter analysis to be performed, one or more of interception points 805(1)-(6) may be switched off, and so no interception point information gathered at that point. As also noted earlier herein, chronicler object 803(1) can be pre-configured with interception point labels, thus obviating the need to store such information in chronicler object 803(1) (chronicler object 803(2)) as envelope 801(1) (envelope 801(2)) progresses through operations 804(1)-(4) of charging task 800.

FIG. 8B is a simplified block diagram illustrating components of an example chronicler object, according to one embodiment. FIG. 8B thus depicts a chronicler object 810, which is comparable to chronicler object 320 of FIG. 4A, for example. Chronicler object 810, as depicted in FIG. 8B includes a number of interception points, which are depicted FIG. 8B as time points 812(1)-(6). Each of time points 812(1)-(6), in turn, includes an interception point label (depicted in FIG. 8B as interception point labels 814(1)-(6) and a timestamp (depicted in FIG. 8B as timestamps 816 (1)-(6)). As can be seen in FIG. 8B, the elements of chronicler object 810 appear with the appropriate information included therein, chronicler object 810 being, for purposes of this discussion, comparable to chronicler object 803(2) of FIG. 8A, and so, having proceeded through operations 804(1)-(4) of charging task 800 (and thus, interception points 805(1)-(6) of FIG. 8A). As noted elsewhere herein, the times shown in FIG. 8B as having been entered into chronicler object 810 each appear as a time-of-day value for ease of understanding. In fact, a more typical scenario would be to record milliseconds (e.g., in absolute terms (the time of day in milliseconds) or relative terms (e.g., from a given point in time)) in timestamps 816(1)-(6). Further, it will be appreciated in view of the present disclosure that chronicler object 810 can be static in nature (and so support only a set number of interception points, but needing no processing to include interception point labels) or dynamic (thus, being able to store a variable number of interception points, having minimal size for the number of interception points encountered and a flexible approach to interception points enabled/disabled, at the cost of additional processing to add each additional time point).

Figure 8C:
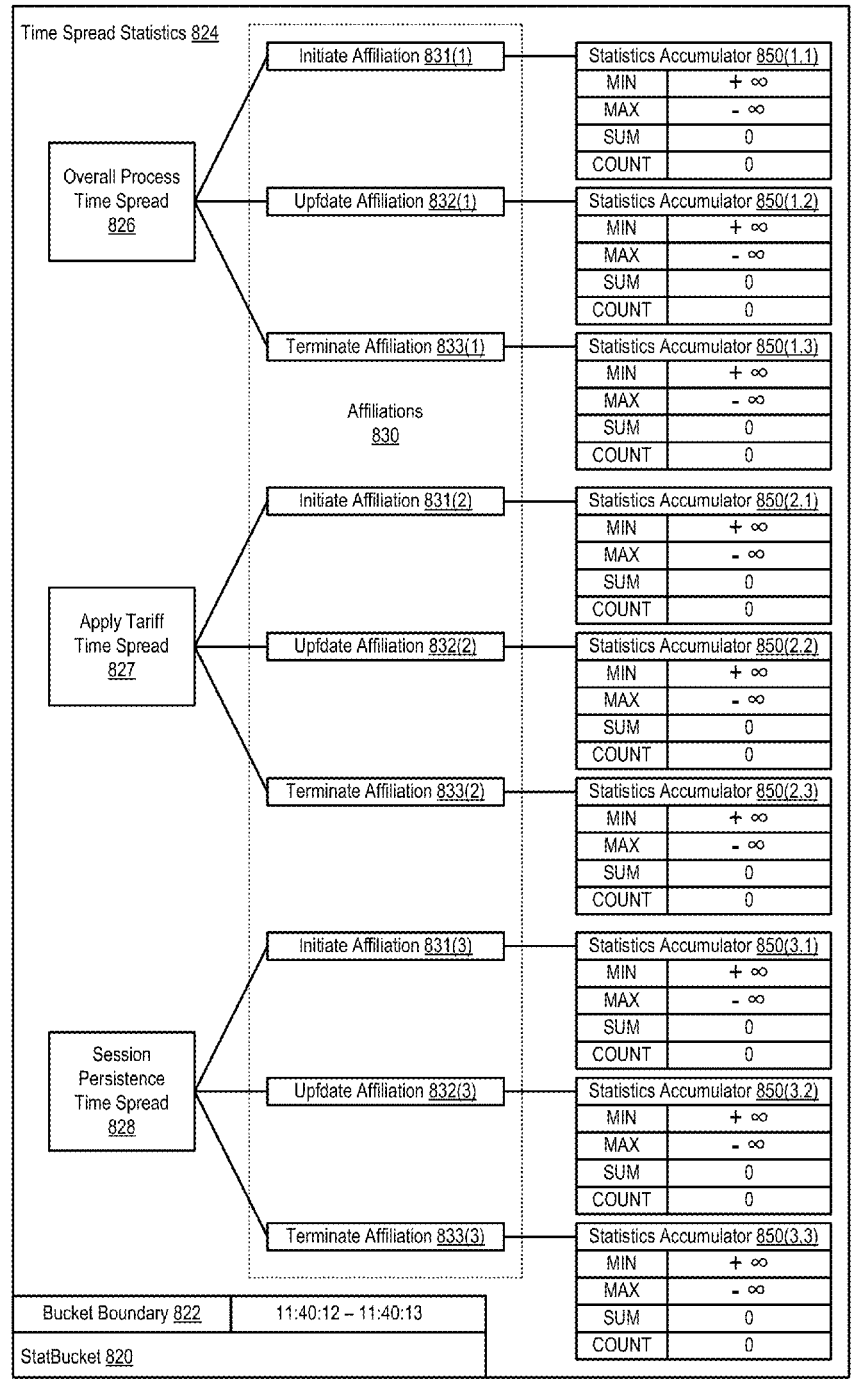
FIGS. 8C and 8D are simplified block diagrams illustrating a before and an after condition of a statistics construct, according to one embodiment.
Figure 8D:
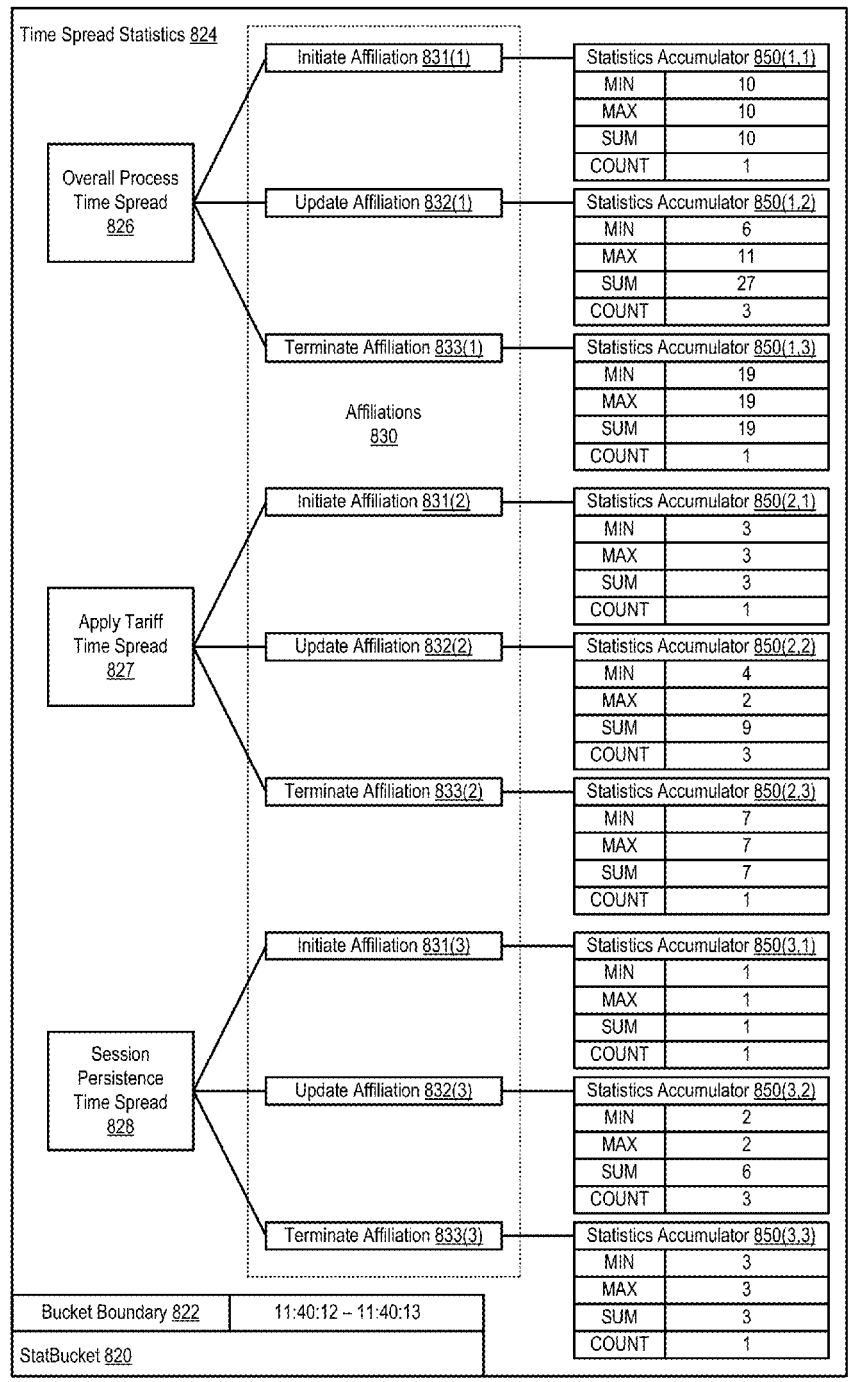

FIGS. 8C and 8D are simplified block diagrams illustrating a before and an after condition of a statistics construct referred to herein as a "StatBucket," according to one embodiment. In FIG. 8C, a statistics construct (depicted as a StatBucket 820) includes information such as a bucket boundary 822 and time spread statistics 824. In turn, time spread statistics 824 include an Overall Process time spread 826, an Applied Tariff time spread 827 and a Session Persistence time spread 828. Affiliations for each of Overall Process time spread 826, Applied Tariff time spread 827, and Session Persistence time spread 828 (depicted in the aggregate in FIGS. 8C and 8D as affiliations 830) are depicted in FIGS. 8C and 8D as including an Initiate Affiliation (depicted in FIGS. 8C and 8D as Initiate Affiliations 831(1)- (3)), an Update Affiliation (depicted in FIGS. 8C and 8D as Update Affiliations 832(1)-(3)), and a Terminate Affiliation (depicted in FIGS. 8C and 8D as Terminate Affiliations 833(1)-(3)), which have associated therewith corresponding ones of statistics accumulators 850. Thus, Overall Process time spread has affiliations associated therewith that include Initiate Affiliation 831(1), Update Affiliation 832(1), and Terminate Affiliation 833(1). Similarly, Apply Tariff time spread 827 is associated with Initiate Affiliation 831(2), Update Affiliation 832(2), and Terminate Affiliation 833(2). Session Persistence time spread 828, in similar fashion, is associated with affiliations that include Initiate Affiliation 831(3), Update Affiliation 832(3), and Terminate Affiliation 833(3). Each of affiliations 830 is then associated with a corresponding statistics accumulator 840. Such statistics accumulators are depicted in FIG. 8C as statistics accumulators 850(1,1)-(3,3).

As will be appreciated, time spreads such as Overall Process time spread 826, an Applied Tariff time spread 827 and a Session Persistence time spread 828 (or other measurements made using approaches such as those described herein) are structures that represent various aggregations of the measurements made using the interception point information gathered using chronicler objects (e.g., chronicler object 320 or 810) and accumulated using accumulator objects (e.g., statistics accumulators 850(1,1)-(3,3)). As will be appreciated, statistics accumulators 850(1,1)-(3,3) can be single instances of such accumulators, or can themselves contain interception point information accumulated over a number of such accumulators. That being the case, FIG. 8C illustrates StatBucket 820 as its state as a "fresh" (new) current statistics bucket, which has not received any chroniclers. Thus, the various minimum, maximum, sum, and count values reflect "cleared" values (e.g., a sum and count of zero, minimum values of plus infinity, and maximum values of negative infinity). By contrast, FIG. 8D reflects StatBucket 820 in a state after having received 5 chronicler objects.

In the manner noted, an administrator may choose to enable or disable particular time spreads in the latency monitoring and reporting settings editor. For example, if a given time spread, such as APPLY_TARIFF, is not relevant to the measurements being taken, there is no advantage to collecting time points which define that time spread. By enabling and disabling time point intelligently, the processing system can operate more efficiently, and the chronicler object in question can be smaller. In one embodiment, at a minimum, only "OVERALL_PROCESS" time spread is enabled, resulting in the chronicler object containing only two time points. In contrast, enabling all time spreads would result in the chronicler object attaining its maximum size.

On the client (e.g., one of mediation system 110 or gateway 109), the response to the usage request is received. It will be appreciated that various responses may be simultaneously received and processed by different threads. When monitoring is performed, each response received is intercepted by the monitoring module. Each chronicler object is thus extracted from the envelope in question and routed to the StatReporter. The StatReporter has multiple reporting queues, one for each thread receiving the responses. This prevents (at least for all practical purposes) contention between responses received concurrently, since such responses are processed in separate, dedicated queues. Each queue has its own "current" StatBucket, to which chroniclers received at the particular time period (e.g., the particular second) are routed, as well as a FIFO buffer for expired StatBuckets. At each second boundary, the old "current" StatBucket is sent into the "expired" queue and a fresh "current" StatBucket is created.

As noted, FIG. 8C depicts a "fresh" (new) current StatBucket, which has not received any chroniclers. This current StatBucket has a bucket boundary which is used to determine whether (or not) the bucket has expired. This current StatBucket also has a TimeSpreadStats object. This TimeSpreadStats object holds statistics for each time spread defined in the measurement system. Statistics can be stored in a per-time spread basis, or the statistics can be further grouped by affiliation. An affiliation is the type of request processed (e.g., an INITIATE/UPDATE/TERMINATE/POLICY_INITIATE and so on). In some cases, there may be a requirement to monitor the statistics per such affiliation. For example, the latency of an INITIATE request (when a phone call is established) can be more critical and thus should be differentiated from a latency of a TERMINATE request (which closes the call). Finally, each affiliation is linked to a StatAccumulator object. In certain embodiments, this object stores only four numbers—min, max, sum and count. For example, a response to an INITIATE request might be received on Thread 4 with the Chronicler object used in the previous examples. This Chronicler will be extracted and routed to the StatReporter which, in turn, will push the Chronicler into the current StatBucket associated with Thread 4. Latencies for all three configured TimeSpreads will be calculated (10 s in OVERALL_PROCESS, 3 s in APPLY_TARIFF and is in SESSION_PERSISTENCE). These latencies are then pushed to the StatAccumulator object of the INITIATE affiliation. Note that the StatAccumulator object does not store individual latencies. It only store summarized latencies—min, max, sum and count. Example 5 demonstrates the StatBucket after consuming the Chronicler.

The performance benefit from such approach are many. Latencies are calculated on client side, and latencies can be stored with any appropriate granularity. Further, individual latencies need not be stored. With a realistic throughput of 1000 requests per second, for example, it would not typically be reasonable to store 1000 latencies in the relevant StatBuckets. With the StatAccumulator approach, no matter what the throughput, one affiliation at one times pread only requires four numbers to be stored. Moreover, chronicler objects are no longer needed once processed by StatReporter, which frees up memory.

Statistics retrieval can be accomplished in the following fashion, for example. As discussed above, an actively monitoring system would have N reporting queues (where, in this case, N is the number of threads used for response processing). In this example, each reporting queue has M StatBuckets (where, in this case, M is the reporting window size in seconds). So, when the administrator queries the system for latency, data in these N*M StatBuckets will be summarized. Thus, two or more TimeSpreadStats are easily appendable. When two TimeSpreadStats are appended, StatAccumulators for each TimeSpread and affiliation can easily aggregate their values.

In such manner, when a system is queried, an empty TimeSpreadStats object TSS_SUM, similar to the one in Example 4, is created. However, this TimeSpreadStats object TSS_SUM did not consume any chroniclers. Instead, the logic iterates through all StatBuckets, and appends TimeSpreadStats of those that fall within a requested period of time into TimeSpreadStats object TSS_SUM. Therefore, the final object which is returned to the administrator contains min, max and avg (derived as sum/cnt) latency for each enabled times pread and each affiliation. The performance benefit from such approach are many. Querying happens on demand. If, for some reason, administrator is not interested in latencies at a particular moment in time, then the summarization logic will not run, which promotes efficient use of resources. The nature of StatAccumulators is such that they can be easily appended, so this is not an operation which is complex or resource-consuming from a computational complexity point of view. The time that it takes to query the system designed in such way is fixed e.g. it does not grow with respect to the throughput, since the number of StatBuckets in the system is constant. This is an O(1) order of computational complexity. All data is in memory, which also improves the speed with which such operations are carried out.

A comparably small number of StatBuckets are stored at any given time. Old StatBuckets "fall off" from the FIFO queue and become garbage collected. The idea here is that the mediation client or gateway is not a place to store history of data. It only stores near-real-time data, at most 30 seconds worth of latest data. To store historical data, such as one needed for a 12-hour test run, we recommend querying the system at regular intervals (e.g. every 5 seconds requesting 5 seconds worth of data) and storing the collected latencies in a separate, more appropriate mechanism (possibly persisting them to a filesystem or other such construct).

Figure 9A:
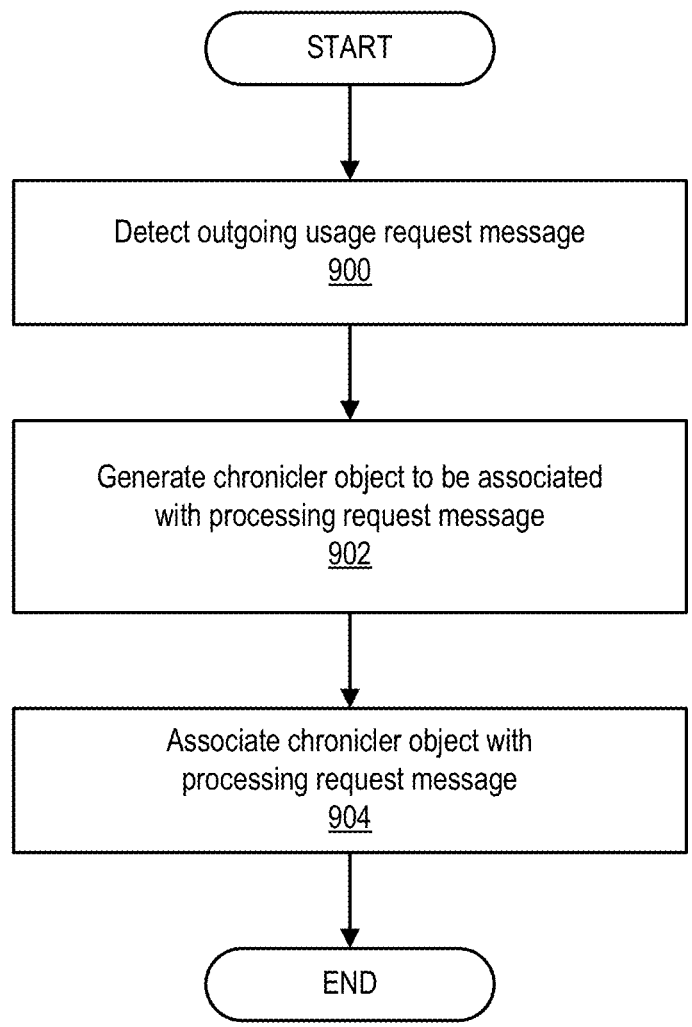
FIG. 9A is a flowchart illustrating an example chronicler object generation process, according to one embodiment.

FIG. 9A is a flowchart illustrating an example chronicler object generation process performed by a message processing service module. In one embodiment, the process illustrated in FIG. 9A starts at operation 900, where a chronicler generation module of the monitoring module detects (e.g., via a usage request detection module) the receipt of a usage request, and the generation of a processing request message at a message processing service module. In another embodiment, the message processing service module is configured to notify the chronicler generator when an processing request message is generated. The process continues to operation 902, where the chronicler generation module generates a chronicler object to be associated with the processing request message. The process continues to operation 904, where a chronicler insertion module associates the chronicler object with the processing request message (e.g., in an envelope), such that the processing request message can be sent to a processing system component such as a charging engine or component thereof. In one embodiment, the chronicler generation module provides the chronicler object thus generated to a thread managed by a thread manager of the message processing service module, which in turn provides the generated chronicler object to the chronicler insertion module. In one embodiment, the chronicler insertion module is configured to include the chronicler object in an envelope in which the processing request message is included. The envelope can then be transmitted to the charging engine. The process then concludes.

Figure 9B:
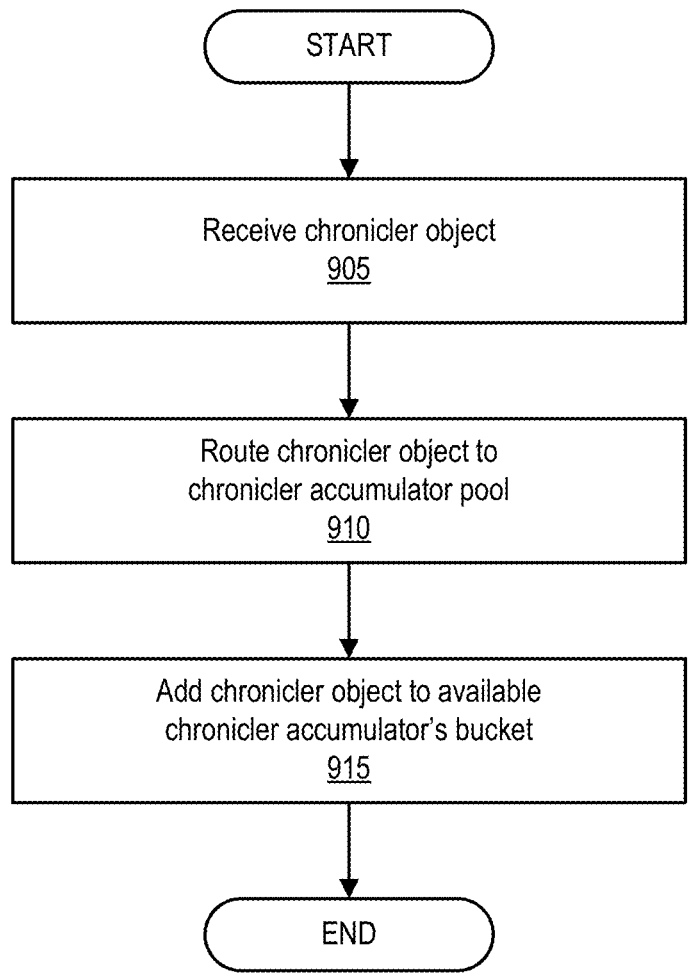
FIG. 9B is a flowchart illustrating an example chronicler object receipt process, according to one embodiment.

FIG. 9B is a flowchart illustrating an example chronicler object receipt process performed by a message processing service module. The process illustrated in FIG. 9B starts at operation 905, where a chronicler extraction module of the message processing service module receives a chronicler object (or, alternatively, an envelope from which such a chronicler object is to be extracted). The process continues to operation 910, where the chronicler extraction module routes the chronicler object to a chronicler accumulation module. In one embodiment, the chronicler extraction module provides the chronicler object to a thread managed by a thread manager of the messaging processing service module, which in turn routes the chronicler object to a chronicler accumulation module. The process continues to operation 915, where the chronicler object is accumulated in the appropriate chronicler accumulator. The process illustrated in FIG. 9B then concludes.

Figure 9C:
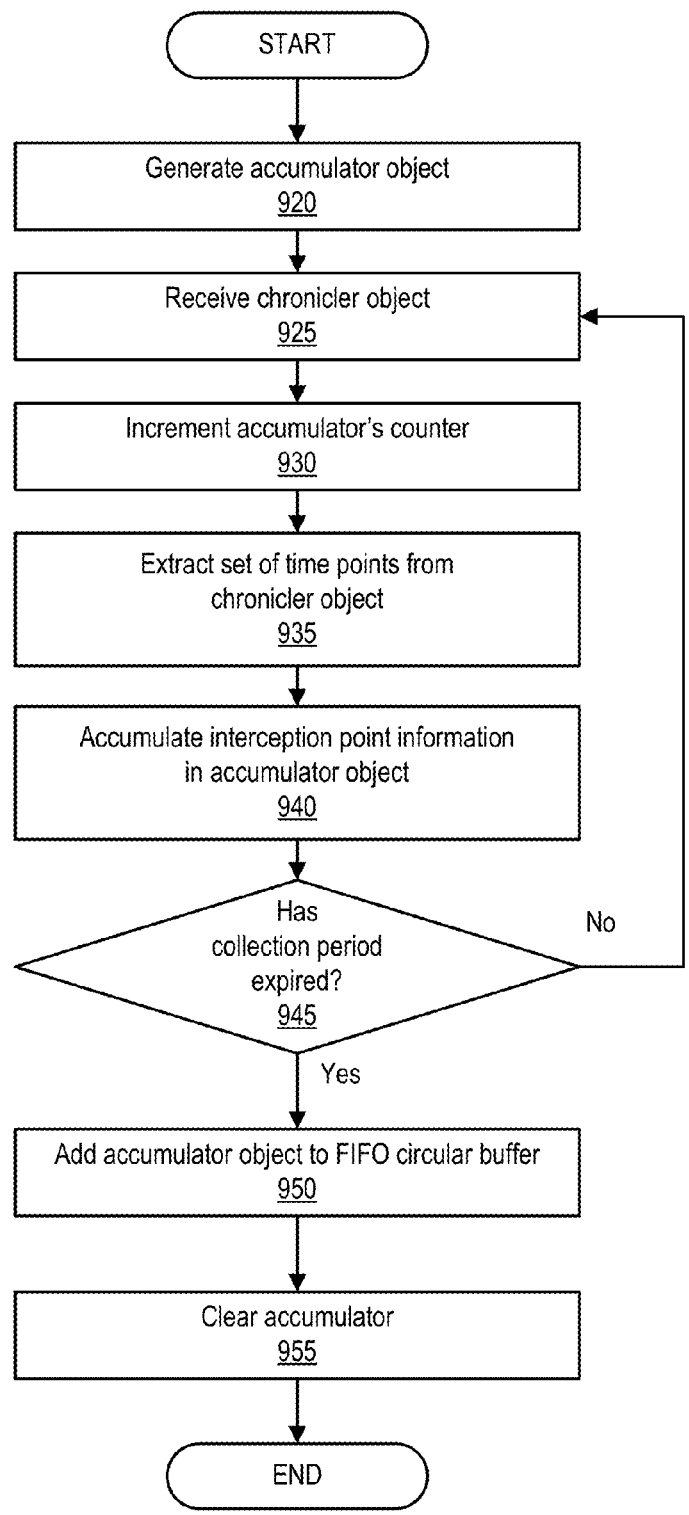
FIG. 9C is a flowchart illustrating an example accumulator object generation process, according to one embodiment.

FIG. 9C is a flowchart illustrating an example accumulator object generation and accumulation process performed by a chronicler accumulation module of a message processing service module. In certain embodiments, the process illustrated in FIG. 9C is cyclically or repeatedly performed for each collection period. The process illustrated in FIG. 9C starts at operation 920, where the chronicler accumulation module generates (or, in the alternative, resets) an accumulator object at the beginning of a collection period. The chronicler accumulation module also sets an accumulator time identifier (ID) in the accumulator object that indicates the accumulator object is associated with a particular collection period. The chronicler accumulation module also initializes a counter in the accumulator object to zero. The process continues to operation 925, where a chronicler object is received. The process continues to operation 930, where the accumulator's counter is incremented, in order to reflect a total number of time points are accumulated in the accumulator object (and so, a total number of chronicler objects that have been accumulated into the accumulator object). The process continues to operation 935, where the chronicler accumulation module extracts a set of time points of the chronicler object from the chronicler object, in response to the chronicler object being received during the collection period. The process continues to operation 940, where the chronicler accumulator accumulates the interception point information (e.g., the (extracted) set of time points) in the accumulator object. The process continues to operation 945, where chronicler accumulation module determines whether the collection period has expired. If the collection period has not expired, the process returns to operation 925 to continue processing chronicler objects that are received in the chronicler accumulator's bucket during the collection period.

If the collection period has expired, the process continues to operation 950, where the chronicler accumulation module adds the accumulator object to the chronicler accumulator's FIFO circular buffer. The process continues to operation 955, where chronicler accumulation module completes processing of the accumulator, and clears or deallocates the accumulator. In one embodiment, if chronicler accumulation module needs to complete processing of one or more chronicler objects in the bucket after the collection period has expired, the chronicler accumulator can place the one or more chronicler objects in a temporary storage area to complete processing, in order to clear the bucket in time to begin collecting chronicler objects during the next collection period. Alternatively, the queue(S) holding such accumulators can be configured with an excess of slots, in order to avoid such contentions. The process then concludes.

Figure 10A:
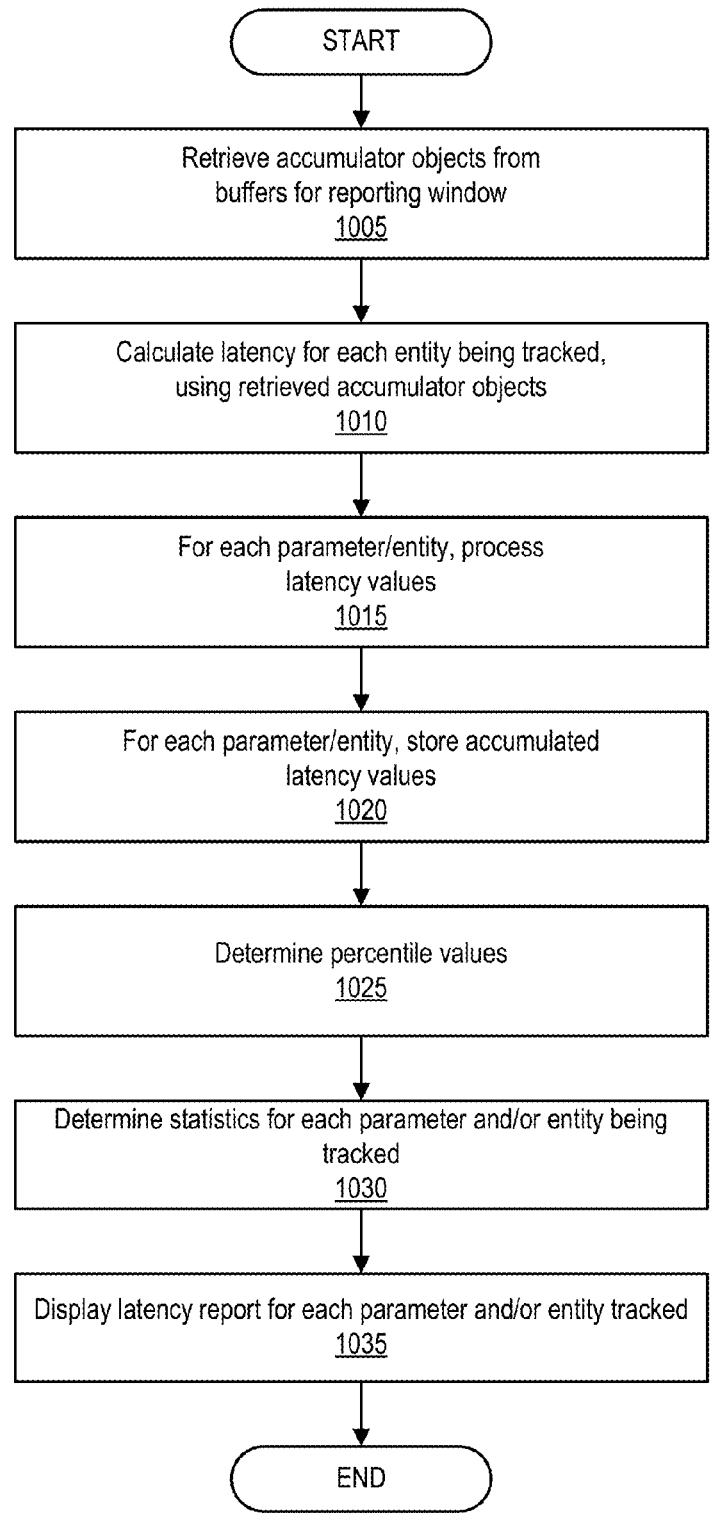
FIG. 10A is a flowchart illustrating an example latency reporting process, according to one embodiment.

FIG. 10 is a flowchart illustrating example latency reporting process performed by a latency reporter of the chronicler processing service module. The process illustrated in FIG. 10 can be performed at the time an administrator specifies or requests that a latency report should be generated (e.g., on a recurring periodic basis, at times when performance criteria are not met, and/or on demand). A live or near-real-time latency report can also be provided to an administrator in a viewer of the statistics reporter until the administrator closes the viewer. The process illustrated in FIG. 10 includes operation 1005, where a statistics generator of the latency reporter retrieves a batch of accumulator objects from FIFO circular buffers. This is typically an ongoing operation, and the FIFO buffers are typically only designed to store a relatively small number of accumulators. The information from the buffers is thus typically stored offline for subsequent analysis. Each "batch" of accumulator objects includes time points that were received during a given reporting window (and so, are downloaded in that order, though as noted, such accumulators can be easily combined with one another to simplify such operations)). In one embodiment, if accumulator objects are stored in a repository for long term storage, accumulator objects or their accumulations can be retrieved from the repository. In such an embodiment, an administrator can specify an older reporting window (or length of time) from which to retrieve the accumulator objects (e.g., accumulator objects associated with a time ID that falls within the specified reporting window).

The process continues to operation 1010, where the statistics generator calculates latency for each parameter and/or entity being tracked, using the accumulated time points included in the retrieved accumulator objects. As noted, an administrator can specify that latency should be tracked at one or more entities, where an entity includes one or more charging components of the charging engine and/or one or more sub-processes performed by one or more charging components. For example, an administrator may wish to monitor latency at a particular charging component (e.g., monitor the length of time that the charging component takes to process a usage request message), at a particular sub-process performed by a charging component (e.g., monitor the length of time that the sub-process takes to complete), or over a combination of charging components and/or sub-processes (or over an entity). Since one or more charging components cooperatively implement charging operations, an administrator may decide that latency should be monitored over one or more particular portions of the transmission path through the charging engine that traverses one or more entities, and can turn on interception points (prior to running the latency report) that correspond to those entities. Latency can be calculated for an entity being tracked using the accumulated information.

In certain embodiments, latency for a charging component or a sub-process is determined as a length of time measured between two interception points on either "side" of the charging component or sub-process, such as determining the difference between a first timestamp collected at a receiving interception point and a second timestamp collected at a transmitting interception point located at the charging component or sub-process. Latency for an entity that includes one or more charging components or sub-processes is determined as a length of time measured between two interception points on either "side" of the entity, such as determining the difference between a first timestamp collected at an initial receiving interception point located at a first charging component or sub-process of the entity and a second timestamp collected at a final transmitting interception point located at a last charging component or sub-process of the entity (e.g., "initial" indicating a first charging component or sub-process encountered by a chronicler object as the chronicler object travels the portion of the transmission path, and "final" indicating a last charging component or sub-process encountered by the chronicler object as the chronicler object travels the portion of the transmission path). In one embodiment, each time spread indicates the latency experienced over the time period by an associated charging component or sub-process. Accumulated latencies for an entity that includes one or more charging components and/or sub-processes can be determined by determining the time spreads of each of those one or more charging components and/or sub-processes.

The process continues to operation 1015, where statistics generator processes the accumulated latency values for each parameter and/or entity being tracked. Latencies can be associated with a portion (or sub-range) of a total range of latency values, on the order of milliseconds (or on an order that is comparable with the expected latency values). The number of latencies and sub-ranges for each latency metric can be specified and changed by an administrator in latency reporting settings. For example, five latency ranges can be defined to cover five sub-ranges of latency values, such as 0-30 ms, 30-40 ms, 40-50 ms, and 50 ms or greater, which track expected latencies that fall in the 30-50 ms range. Granularity of latency reporting can be increased by increasing the number of latency ranges used and reducing the sub-range associated with each ranges (e.g., 6 sub-ranges in 10 ms increments (0-10 ms, 10-20 ms, 20-30 ms, 30-40 ms, 40-50 ms, and >50 ms), 11 sub-ranges in 5 ms increments, or other such even increments, or combinations of irregular sub-ranges in varying increments, as in the earlier example). Each latency value is sorted into a latency ranges that is associated with a sub-range within which the latency value falls.

The process continues to operation 1020, where the statistics generator stores the latency values thus calculated. The process continues to operation 1025, where the statistics generator determines latency percentile values for each entity being tracked. For an entity/parameter being tracked, statistics generator determines the latency percentile value, where the latency percentile value indicates that some percentage of the total number of usage request messages have a latency that falls within the sub-range associated with the latency range.

Figure 10B:
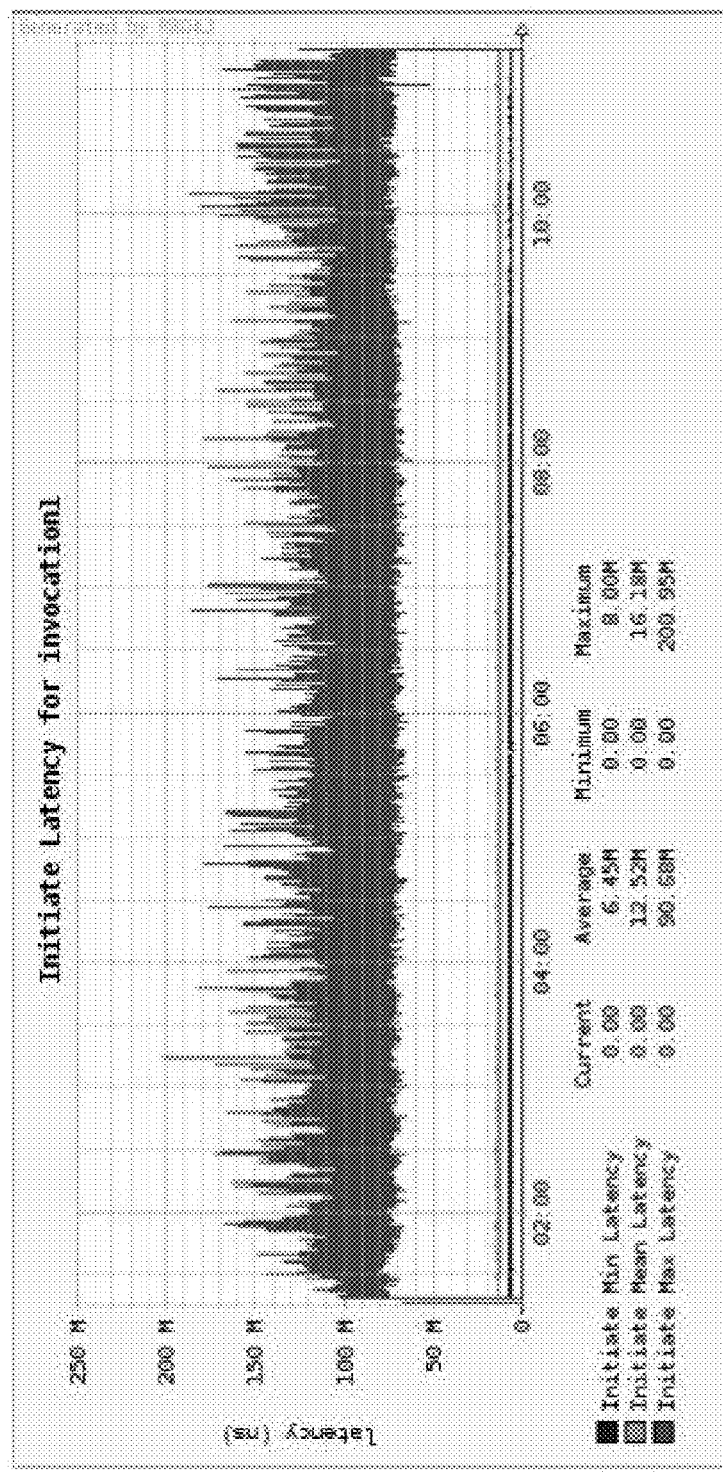
FIG. 10B is a user interface illustrating an example latency reporting information, according to one embodiment.
Figure 10C:
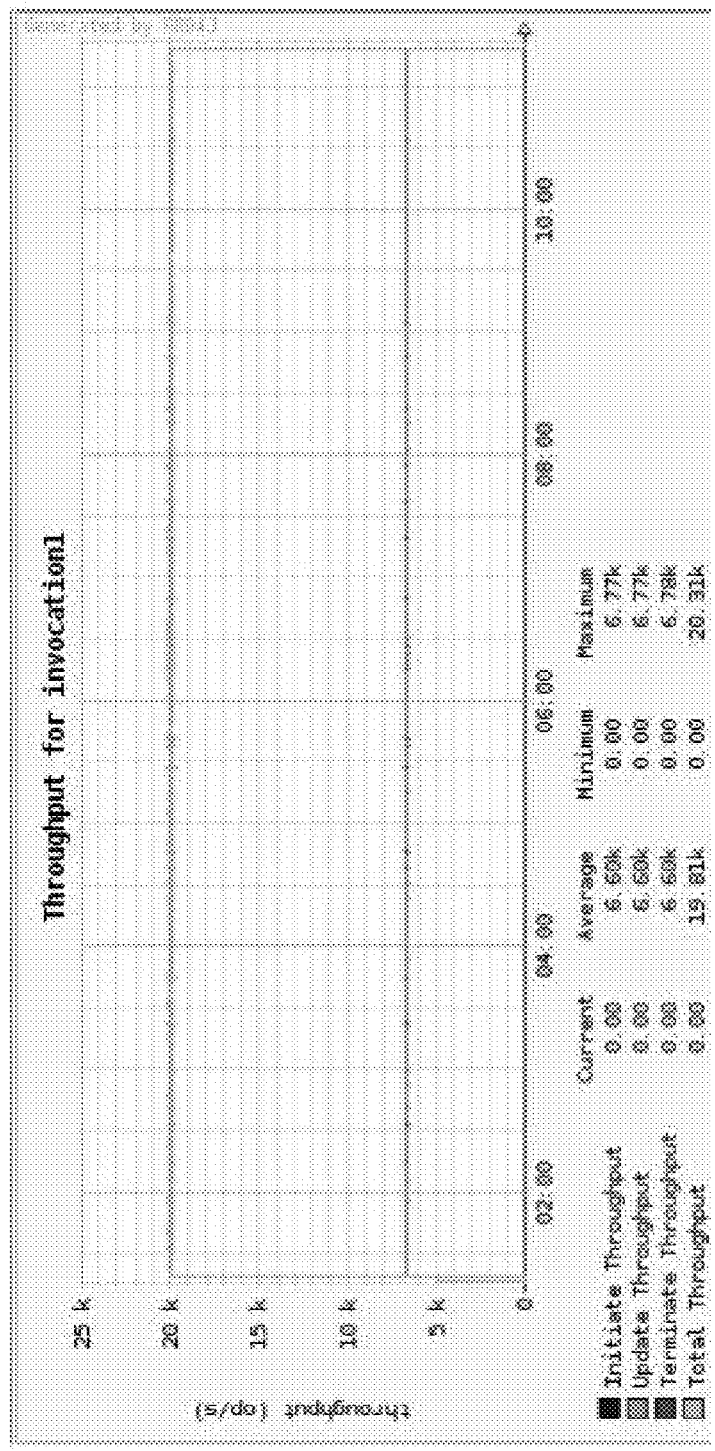
FIG. 10C is a user interface illustrating an example latency reporting information, according to one embodiment.

The process continues to operation 1030, where statistics generator determines a set of latency statistics for each entity being tracked. Latency statistics can be determined from the latency values calculated in operation 1010. Example latency statistics include a minimum latency value, a maximum latency value, a mean latency value, and/or an average latency value, among others. While operation 1030 is illustrated as occurring subsequent to operations 1015-1025, operation 1030 can be performed prior to or concurrently with operation 1015-1025. The process continues to operation 1035, where a report generator generates a latency report and displays information about the latency for each entity being tracked. The latency report can include the latency percentile values, the latency statistics, and a summary visual graph of the latency values. Examples of the visual graph include a bar graph, line graph, pie chart, and the like, that represents the various latency percentiles. A near-real-time or a live latency report can display running values of the latency statistics, as they may change over the reporting window as the reporting window moves through time. The latency reports may be stored in statistics and reporting repository 216 for long term storage, and can be later viewed by an administrator. FIGS. 10B and 10C are user interfaces illustrating an example latency reporting information, according to one embodiment. As can be seen therein, the graphical representation of the accumulated information aggregated using methods and systems such as those described herein provides quick and easy analysis of processing system performance.

An Example Computing and Network Environment

As shown above, the present invention can be implemented using a variety of computer systems and networks. An example of one such computing and network environment is described below with reference to FIGS. 11 and 12.

Figure 11:
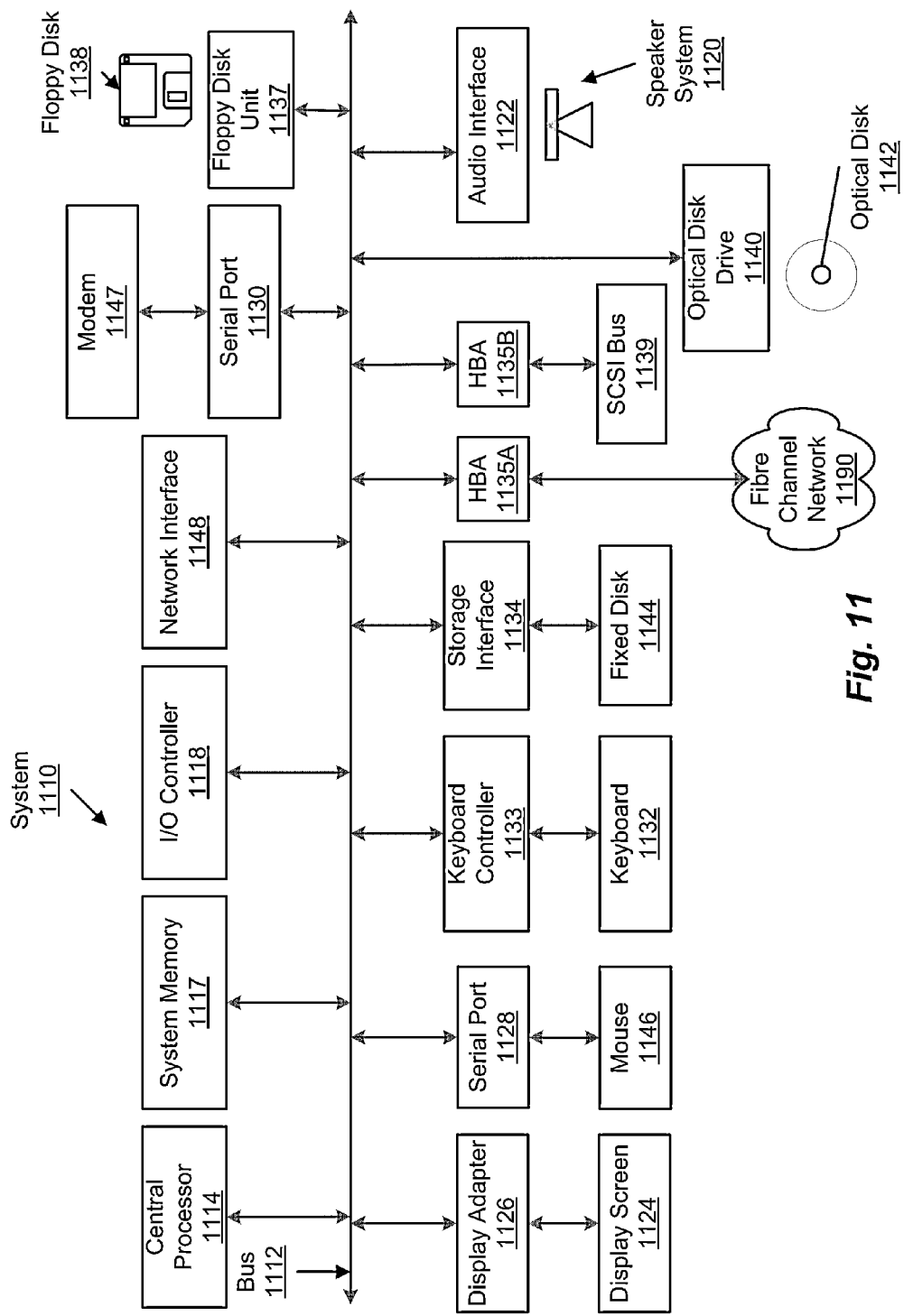
FIG. 11 is a simplified block diagram of a computer system suitable for implementing aspects of the present disclosure, according to one embodiment.

FIG. 11 depicts a block diagram of a computer system 1110 suitable for implementing aspects of the present invention (e.g., for implementing computing devices for implementing various system components, such as user equipment 107, gateway 109, mediation system 110, charging engine 115 and/or external billing/charging engine 125). Computer system 1110 includes a bus 1112 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fibre Channel network 1190, a host bus adapter (HBA) interface card 1135B operative to connect to a SCSI bus 1139, and an optical disk drive 1140 operative to receive an optical disk 1142. Also included are a mouse 1146 (or other point-and-click device, coupled to bus 1112 via serial port 1128), a modem 1147 (coupled to bus 1112 via serial port 1130), and a network interface 1148 (coupled directly to bus 1112).

Bus 1112 allows data communication between central processor 1114 and system memory 1117, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1110 are generally stored on and accessed via a computer-readable medium, such as a hard disk drive (e.g., fixed disk 1144), an optical drive (e.g., optical drive 1140), a floppy disk unit 1137, or other storage medium. Additionally, applications can be in the form of electronic signals modulated in accordance with the application and data communication technology when accessed via network modem 1147 or interface 1148.

Storage interface 1134, as with the other storage interfaces of computer system 1110, can connect to a standard computer-readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 11 need not be present to practice the present invention. The devices and subsystems can be interconnected in different ways from that shown in FIG. 11. The operation of a computer system such as that shown in FIG. 11 is readily known in the art and is not discussed in detail in this application. Code to implement the present invention can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 12:
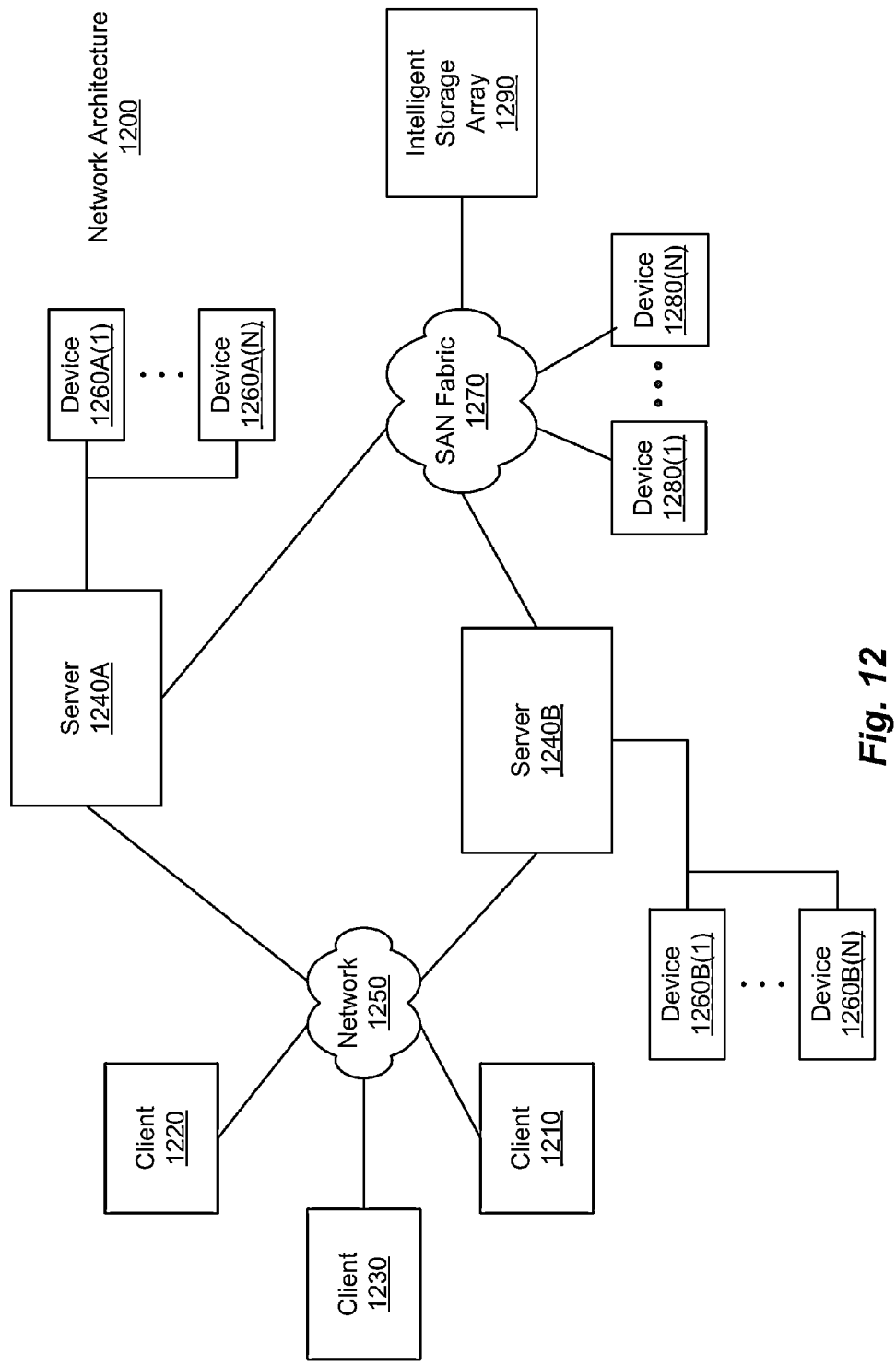
FIG. 12 is a simplified block diagram of a network architecture suitable for implementing aspects of the present disclosure, according to one embodiment.

FIG. 12 is a block diagram depicting a network architecture 1200 in which client systems 1210, 1220 and 1230, as well as storage servers 1240A and 1240B (any of which can be implemented using computer system 1110), are coupled to a network 1250. Storage server 1240A is further depicted as having storage devices 1260A(1)-(N) directly attached, and storage server 1240B is depicted with storage devices 1260B(1)-(N) directly attached. Storage servers 1240A and 1240B are also connected to a SAN fabric 1270, although connection to a storage area network is not required for operation of the invention. SAN fabric 1270 supports access to storage devices 1280(1)-(N) by storage servers 1240A and 1240B, and so by client systems 1210, 1220 and 1230 via network 1250. Intelligent storage array 1290 is also shown as an example of a specific storage device accessible via SAN fabric 1270.

With reference to computer system 1210, modem 1147, network interface 1148 or some other method can be used to provide connectivity from each of client computer systems 1210, 1220 and 1230 to network 1250. Client systems 1210, 1220 and 1230 are able to access information on storage server 1240A or 1240B using, for example, a web browser or other client software (not shown). Such a client allows client systems 1210, 1220 and 1230 to access data hosted by storage server 1240A or 1240B or one of storage devices 1260A(1)-(N), 1260B(1)-(N), 1280(1)-(N) or intelligent storage array 1290. FIG. 12 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 1110). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof, including the specialized systems described herein.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   at a mediation system including one or more servers,
   receiving a request for service generated by a user equipment seeking access to services provided by a telecommunications network, and, in response, generating a usage request message;
   generating, by the mediation system, a chronicler object, in response to detection of the usage request message being generated;
   generating, by the mediation system, an envelope;
   inserting, by the mediation system, the chronicler object and the usage request message in the envelope;
   defining, by a network administrator, a plurality of interception points in a telecommunications network charging engine for the chronicler object, wherein each of the interception points indicates a point in processing of the usage request message by an individual component of the charging engine at which the chronicler object should be considered intercepted;
   transmitting, by the mediation system, the envelope including the usage request message and the chronicler object to the charging engine, wherein the chronicler object is configured to collect a set of time points as the chronicler object travels through the charging engine and as the usage request message is processed by a plurality of individual components of the charging engine, the set of time points including time points associated with the plurality of individual components within the charging system, wherein the charging engine inserts a time point into the chronicler object each time an interception point is encountered, and each of the time points includes a timestamp and an interception point label;
   receiving the chronicler object with a usage response message from the charging engine;
   calculating, using the set of time points, latency of the charging engine in processing the usage request, wherein calculating the latency includes calculating a latency associated with at least two different ones of the individual components within the charging system;
   retrieving a batch of accumulator objects from a plurality of FIFO circular buffers in response to a request to generate a latency report for an entity, wherein the entity comprises one or more components of the charging engine;
   calculating latency for the entity using information contained in the batch of accumulator objects, wherein the information comprises a plurality of sets of time points extracted from a plurality of chronicler objects that have collected the plurality of sets of time points in the one or more components of the charging engine; and
   generating the latency report for the entity, wherein the latency report comprises a visual graph that illustrates the latency for the entity over time, and one or more latency statistics determined from the latency of the entity.

2. The method of claim 1, further comprising:
   generating an accumulator object, wherein the accumulator object is associated with a collection period, and the chronicler object is received during the collection period;
   extracting the set of time points from the chronicler object, in response to the receiving the chronicler object; and
   adding the set of time points to the accumulator object.

3. The method of claim 2, further comprising:
   adding the accumulator object to a FIFO (first in first out) circular buffer upon expiration of the collection period, wherein
   the FIFO circular buffer is configured to temporarily store a plurality of accumulator objects that are received at the FIFO circular buffer during a reporting window.

4. The method of claim 1, wherein the calculating the latency comprises:
   determining a length of a time between a first timestamp collected at a first interception point in the charging engine and a second timestamp collected at a second interception point in the charging engine, wherein
   the set of time points comprise the first timestamp and the second timestamp, and the set of time points further comprise a first point label associated with the first interception point and a second point label associated with the second interception point.

5. The method of claim 1, wherein the calculating the latency comprises:
summing one or more time spreads to calculate the latency for the entity, wherein the set of time points comprise one or more time spreads that each indicate a length of time associated with the one or more components of the charging engine.

6. A non-transitory computer-readable medium configured to store program instructions that, when executed on a processor, are configured to cause the processor to perform operations comprising:
at a mediation system including one or more servers, receiving a request for service generated by a user equipment seeking access to services provided by a telecommunications network, and, in response, generating a usage request message;
generating, by the mediation system, a chronicler object, in response to detection of the usage request message being generated;
generating, by the mediation system, an envelope;
inserting, by the mediation system, the chronicler object and the usage request message in the envelope;
defining, by a network administrator, a plurality of interception points in a telecommunications network charging engine for the chronicler object, wherein each of the interception points indicates a point in processing of the usage request message by an individual component of the charging engine at which the chronicler object should be considered intercepted;
transmitting, by the mediation system, the envelope including the usage request message and the chronicler object to the charging engine, wherein the chronicler object is configured to collect a set of time points as the chronicler object travels through the charging engine and as the usage request message is processed by a plurality of individual components of the charging engine, the set of time points including time points associated with the plurality of individual components within the charging system, wherein the charging engine inserts a time point into the chronicler object each time an interception point is encountered, and each of the time points includes a timestamp and an interception point label;
receiving the chronicler object with a usage response message from the charging engine;
calculating, using the set of time points, latency of the charging engine in processing the usage request, wherein calculating the latency includes calculating a latency associated with at least two different ones of the individual components within the charging system;
retrieving a batch of accumulator objects from a plurality of FIFO circular buffers in response to a request to generate a latency report for an entity, wherein the entity comprises one or more components of the charging engine;
calculating latency for the entity using information contained in the batch of accumulator objects, wherein the information comprises a plurality of sets of time points extracted from a plurality of chronicler objects that have collected the plurality of sets of time points in the one or more components of the charging engine; and
generating the latency report for the entity, wherein the latency report comprises a visual graph that illustrates the latency for the entity over time, and one or more latency statistics determined from the latency of the entity.

7. The non-transitory computer-readable medium of claim 6, the method further comprising:
generating an accumulator object, wherein the accumulator object is associated with a collection period, and the chronicler object is received during the collection period;
extracting the set of time points from the chronicler object, in response to the receiving the chronicler object; and
adding the set of time points to the accumulator object.

8. The non-transitory computer-readable medium of claim 7, the method further comprising:
adding the accumulator object to a FIFO (first in first out) circular buffer upon expiration of the collection period, wherein
the FIFO circular buffer is configured to temporarily store a plurality of accumulator objects that are received at the FIFO circular buffer during a reporting window.

9. The non-transitory computer-readable medium of claim 6, wherein the calculating the latency comprises:
determining a length of a time between a first timestamp collected at a first interception point in the charging engine and a second timestamp collected at a second interception point in the charging engine, wherein
the set of time points comprise the first timestamp and the second timestamp, and
the set of time points further comprise a first point label associated with the first interception point and a second point label associated with the second interception point.

10. The non-transitory computer-readable medium of claim 6, wherein the calculating the latency comprises summing one or more time spreads to calculate the latency for the entity, wherein the set of time points comprise one or more time spreads that each indicate a length of time associated with the one or more components of the charging engine.

11. A system comprising:
a telecommunications network charging engine including a plurality of interception points configurable by a network administrator for a chronicler object, wherein each of the interception points indicates a point in processing of a usage request message by an individual component of the charging engine at which the chronicler objected should be considered intercepted;
a mediation system comprising one or more servers, each of the one or more servers including:
a processor;
a memory, coupled to the processor;
a non-transitory computer-readable storage medium coupled to the processor; and
a plurality of instructions, encoded in the non-transitory computer-readable storage medium and configured to cause the processor to implement:
a message processing service module for receiving a request for service generated by a user equipment seeking access to services provided by a telecommunications network, and, in response, generating the usage request message and an envelope;
a chronicler generator configured to generate a chronicler object, in response to detection of the usage request message being generated;

a chronicler insertion module for inserting the chronicler object and the usage request message in the envelope;

a chronicler transmitter configured to transmit the envelope including the usage request message and the chronicler object to the charging engine, wherein the chronicler object is configured to collect a set of time points as the chronicler object travels through the charging engine and as the usage request message is processed by a plurality of individual components of the charging engine, the set of time points including time points associated with the plurality of individual components within the charging system, wherein the charging engine inserts a time point in the chronicler object each time an interception point is encountered, and each of the time points includes a timestamp and an interception point label;

a chronicler receiver configured to receive the chronicler object from the charging engine; and a latency reporter configured to calculate, using the set of time points, latency of the charging engine in processing the usage request message, wherein calculating the latency includes calculating a latency associated with at least two different ones of the individual components within the charging system, wherein the latency reporter is further configured to retrieve a batch of accumulator objects from a plurality of FIFO circular buffers in response to a request to generate a latency report for an entity, wherein the entity comprises one or more components of the charging engine, wherein the latency reporter is further configured to calculate latency for the entity using information contained in the batch of accumulator objects, wherein the information comprises a plurality of sets of time points extracted from a plurality of chronicler objects that have collected the plurality of sets of time points in the one or more components of the charging engine, wherein the latency reporter is further configured to generate the latency report for the entity, wherein the latency report comprises a visual graph that illustrates the latency for the entity over time, and one or more latency statistics determined from the latency of the entity.

12. The system of claim 11, the instructions further configured to:

implement a chronicler accumulator configured to generate an accumulator object, wherein the accumulator object is associated with a collection period, and the chronicler object is received during the collection period, extract the set of time points from the chronicler object, in response to the receiving the chronicler object, and add the set of time points to the accumulator object.

13. The system of claim 12, the chronicler accumulator further configured to:

add the accumulator object to a FIFO (first in first out) circular buffer upon expiration of the collection period, wherein the FIFO circular buffer is configured to temporarily store a plurality of accumulator objects that are received at the FIFO circular buffer during a reporting window.

14. The system of claim 11, wherein the latency reporter is further configured to:

determine a length of a time between a first timestamp collected at a first interception point in the charging engine and a second timestamp collected at a second interception point in the charging engine, wherein the set of time points comprise the first timestamp and the second timestamp, and the set of time points further comprise a first point label associated with the first interception point and a second point label associated with the second interception point.

15. The system of claim 11, wherein the latency reporter is further configured to:

sum one or more time spreads to calculate the latency for the entity, wherein the set of time points comprise one or more time spreads that each indicate a length of time associated with the one or more components of the charging engine.

* * * * *

UNITED STATES PATENT AND TRADEMARK OFFICE
CERTIFICATE OF CORRECTION

PATENT NO. : 10,333,724 B2
APPLICATION NO. : 14/554026
DATED : June 25, 2019
INVENTOR(S) : Piro, Jr. et al.

It is certified that error appears in the above-identified patent and that said Letters Patent is hereby corrected as shown below:

In the Specification

In Column 3, Line 59, after "system" insert -- . --.

In Column 10, Line 33, after "implemented" insert -- . --.

In Column 13, Line 31, delete "FIG." and insert -- FIGS. --, therefor (2nd occurrence).

In Column 14, Line 13, delete "example." and insert -- example, --, therefor.

In Column 14, Line 29, delete "FIG." and insert -- FIGS. --, therefor.

In Column 14, Line 56, delete "FIG." and insert -- FIGS. --, therefor.

In Column 22, Line 36, delete "interception" and insert -- Interception --, therefor (2nd occurrence).

In Column 22, Line 39, delete "FIG." and insert -- FIGS. --, therefor.

In Column 23, Line 21, delete "Fib." and insert -- FIG. --, therefor.

In Column 24, Line 21, delete "FIG." and insert -- FIGS. --, therefor.

In the Claims

In Column 42, Line 50, in Claim 11, delete "objected" and insert -- objects --, therefor.

Signed and Sealed this
Twenty-first Day of July, 2020

Andrei Iancu
*Director of the United States Patent and Trademark Office*